(12) United States Patent
Mori et al.

(10) Patent No.: US 11,039,455 B2
(45) Date of Patent: *Jun. 15, 2021

(54) WIRELESS COMMUNICATION DEVICE AND METHOD OF WIRELESS COMMUNICATION FOR IMPROVING THE UTILIZATION EFFICIENCY OF RADIO RESOURCES

(71) Applicant: SONY CORPORATION, Tokyo (JP)

(72) Inventors: Masahito Mori, Kanagawa (JP); Yuichi Morioka, Kanagawa (JP); Takeshi Itagaki, Saitama (JP); Eisuke Sakai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 16/393,301

(22) Filed: Apr. 24, 2019

(65) Prior Publication Data

US 2019/0254046 A1 Aug. 15, 2019

Related U.S. Application Data

(63) Continuation of application No. 15/521,291, filed as application No. PCT/JP2015/071806 on Jul. 31, 2015, now Pat. No. 10,314,058.

(30) Foreign Application Priority Data

Oct. 31, 2014 (JP) ................................ 2014-223082

(51) Int. Cl.
*H04W 72/12* (2009.01)
*H04J 11/00* (2006.01)
(Continued)

(52) U.S. Cl.
CPC ......... *H04W 72/1205* (2013.01); *H04J 11/00* (2013.01); *H04L 5/0044* (2013.01);
(Continued)

(58) Field of Classification Search
CPC . H04W 72/1205; H04W 72/04; H04W 84/12; H04L 5/0044; H04L 5/0053; H04L 5/0092; H04L 5/0007; H04J 11/00
See application file for complete search history.

(56) References Cited

U.S. PATENT DOCUMENTS 7,474,676 B2 1/2009 Tao et al.
2008/0049654 A1 2/2008 Otal et al.
(Continued)

FOREIGN PATENT DOCUMENTS

CA 2877484 A1 1/2014
CN 102792628 A 11/2012
(Continued)

OTHER PUBLICATIONS

Gross, et al., "OFDMA Related Issues in VHTL6", IEEE 11-09/138r0, Jan. 21, 2009, 18 pages.
(Continued)

*Primary Examiner* — Kiet Tang
(74) *Attorney, Agent, or Firm* — Chip Law Group

(57) ABSTRACT

A wireless communication device including: a wireless communication unit configured to perform wireless communication with another wireless communication device in accordance with an IEEE 802.11 standard; and a control unit configured to control the wireless communication unit so that the wireless communication unit includes schedule information in a PLCP header defined in the IEEE 802.11 standard and transmits the schedule information to the other wireless communication device, the schedule information relating to orthogonal frequency-division multiple access.

14 Claims, 22 Drawing Sheets

(51) Int. Cl.
*H04W 72/04* (2009.01)
*H04W 84/12* (2009.01)
*H04L 5/00* (2006.01)

(52) U.S. Cl.
CPC .......... *H04L 5/0053* (2013.01); *H04L 5/0092* (2013.01); *H04W 72/04* (2013.01); *H04W 84/12* (2013.01); *H04L 5/0007* (2013.01)

(56) References Cited

U.S. PATENT DOCUMENTS

| | | | |
|---|---|---|---|
| 2009/0316815 A1* | 12/2009 | Glazko | H04L 5/0053 375/260 |
| 2011/0206156 A1 | 8/2011 | Lee et al. | |
| 2011/0222486 A1 | 9/2011 | Hart | |
| 2014/0016607 A1 | 1/2014 | Hart | |
| 2014/0071873 A1* | 3/2014 | Wang | H04W 72/1284 370/311 |
| 2014/0355509 A1* | 12/2014 | Zhao | H04W 76/40 370/312 |
| 2015/0029974 A1 | 1/2015 | Yamazaki | |
| 2015/0029979 A1 | 1/2015 | Onodera et al. | |
| 2015/0139115 A1 | 5/2015 | Seok | |
| 2015/0163028 A1 | 6/2015 | Tandra et al. | |
| 2015/0382216 A1 | 12/2015 | Tian et al. | |
| 2016/0065467 A1 | 3/2016 | Wu et al. | |
| 2016/0080056 A1 | 3/2016 | Porat | |
| 2016/0119453 A1 | 4/2016 | Tian et al. | |
| 2016/0127096 A1 | 5/2016 | Lee et al. | |
| 2016/0249342 A1 | 8/2016 | Hart | |
| 2016/0301491 A1 | 10/2016 | Porat et al. | |
| 2017/0086212 A1 | 3/2017 | Kim et al. | |

FOREIGN PATENT DOCUMENTS

| | | |
|---|---|---|
| CN | 104471873 A | 3/2015 |
| EP | 2822320 A1 | 1/2015 |
| EP | 2871785 A1 | 5/2015 |
| EP | 3065494 A1 | 9/2016 |
| EP | 3151459 A1 | 4/2017 |
| JP | 5851583 B2 | 2/2016 |
| JP | 6045690 B2 | 12/2016 |
| KR | 10-2007-0022038 A | 2/2007 |
| KR | 10-2015-0035569 A | 4/2015 |
| WO | 2011/112279 A1 | 9/2011 |
| WO | 2013/129506 A1 | 9/2013 |
| WO | 2013/141055 A1 | 9/2013 |
| WO | 2014/010786 A1 | 1/2014 |

OTHER PUBLICATIONS

Notice of Allowance and Fees Due for U.S. Appl. No. 15/521,291, dated Jan. 22, 2019, 12 pages.
Non-Final Rejection for U.S. Appl. No. 15/521,291, dated Aug. 30, 2018, 18 pages.
Gross, et al., "OFDMA Related Issues in VHTL6", IEEE 802.11-07/2062rl, Jan. 21, 2009,18 pages.
Hart, et al., "DL-OFDMA for Mixed Clients", IEEE 802.11-1010317r1, Mar. 6, 2010, 24 pages.
Zheng, et al., "LDPC for 11AC", IEEE 802.11-10, 1300-00-00ac, Nov. 8, 2010, 19 pages.
"Wireless LAN Medium Access Control (MAC) and Physical Layer (pHY) Specifications", IEEE Standard for Information Technology Telecommunications and Information Exchange Between Systems Local and Metropolitan area Networks-Specific Requirements, Amendment 4: Enhancements for Very High Throughput for Operation in Bands below 6 GHz, IEEE Std 802.11ac 2013, Dec. 11, 2013, 425 pages.
Extended European Search Report of EP Patent Application No. 15856022.7, dated Oct. 30, 2017, 10 pages.
Office Action for JP Patent Application No. 2016-556394, dated Feb. 20, 2018, 04 pages of Office Action and 03 pages of English Translation.
International Search Report and Written Opinion of PCT Application No. PCT/JP2015/071806, dated Sep. 29, 2015, 06 pages of English Translation and 06 pages of ISRWO.
International Preliminary Report on Patentability of PCT Application No. PCT /JP2015/071806, dated May 11, 2017, 06 pages of English Translation and 04 pages of IPRP.
"IEEE Standard for Information technology—Telecommunications and information exchange between systems Local and metropolitan area networks-Specific Requirements, Part 11: Wireless LAN Medium Access Control (MAC) and Physical Layer (PHY) Specifications", IEEE Standard Association, IEEE Std 802.11ac™-2013, Dec. 18, 2013, 425 pages.
Extended European Search Report of EP Application No. 19185435.5, dated Nov. 6, 2019, 07 pages.
Gross, et al., "OFDMA Related Issues in VHTL6", IEEE 802.11-09/0138r3, Jan. 21, 2009, 18 pages.
Gross, et al., "OFDMA Related Issues in VHTL6", IEEE 802.11-09/0138r3, IEEE Mentor, Jan. 2009, 18 pages.
Hart, et al., "DL-OFDMA for Mixed Clients", IEEE-SA Mentor, vol. 802.11ac, Issue. 1,Mar. 2010, 24 pages.
Extended European Search Report of EP Application No. 20181192.4, dated Oct. 14, 2020, 11 pages.

* cited by examiner

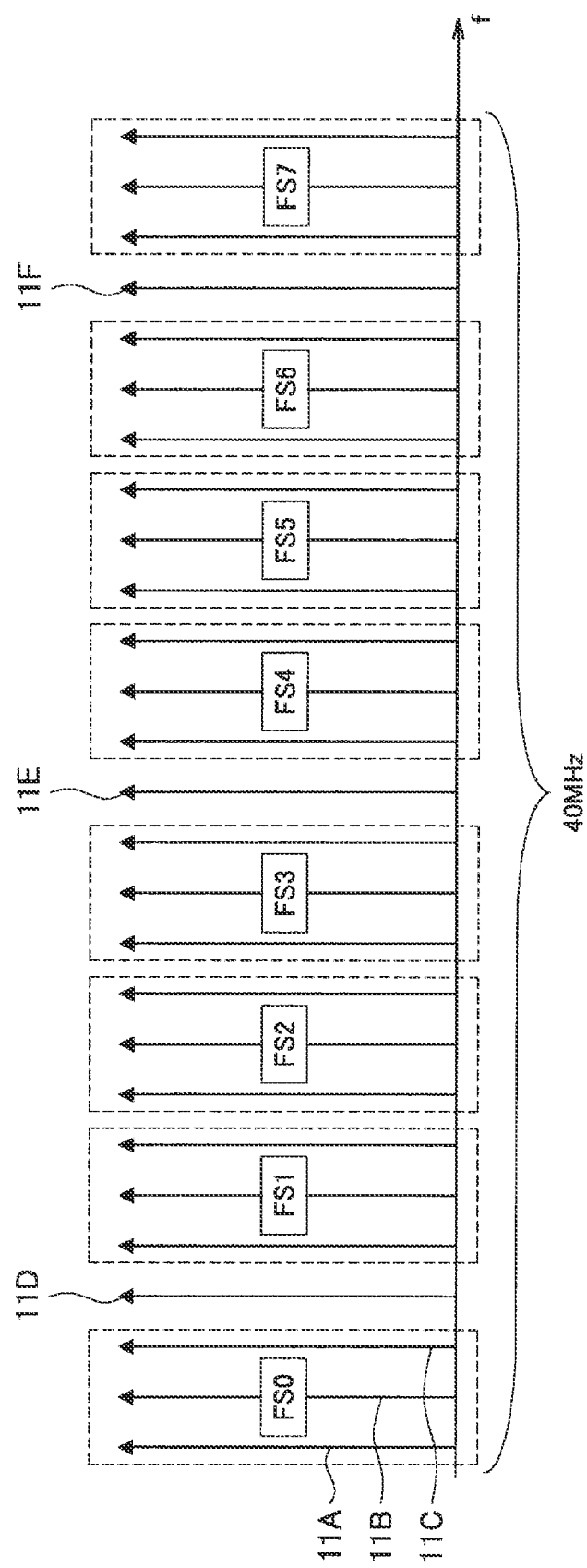

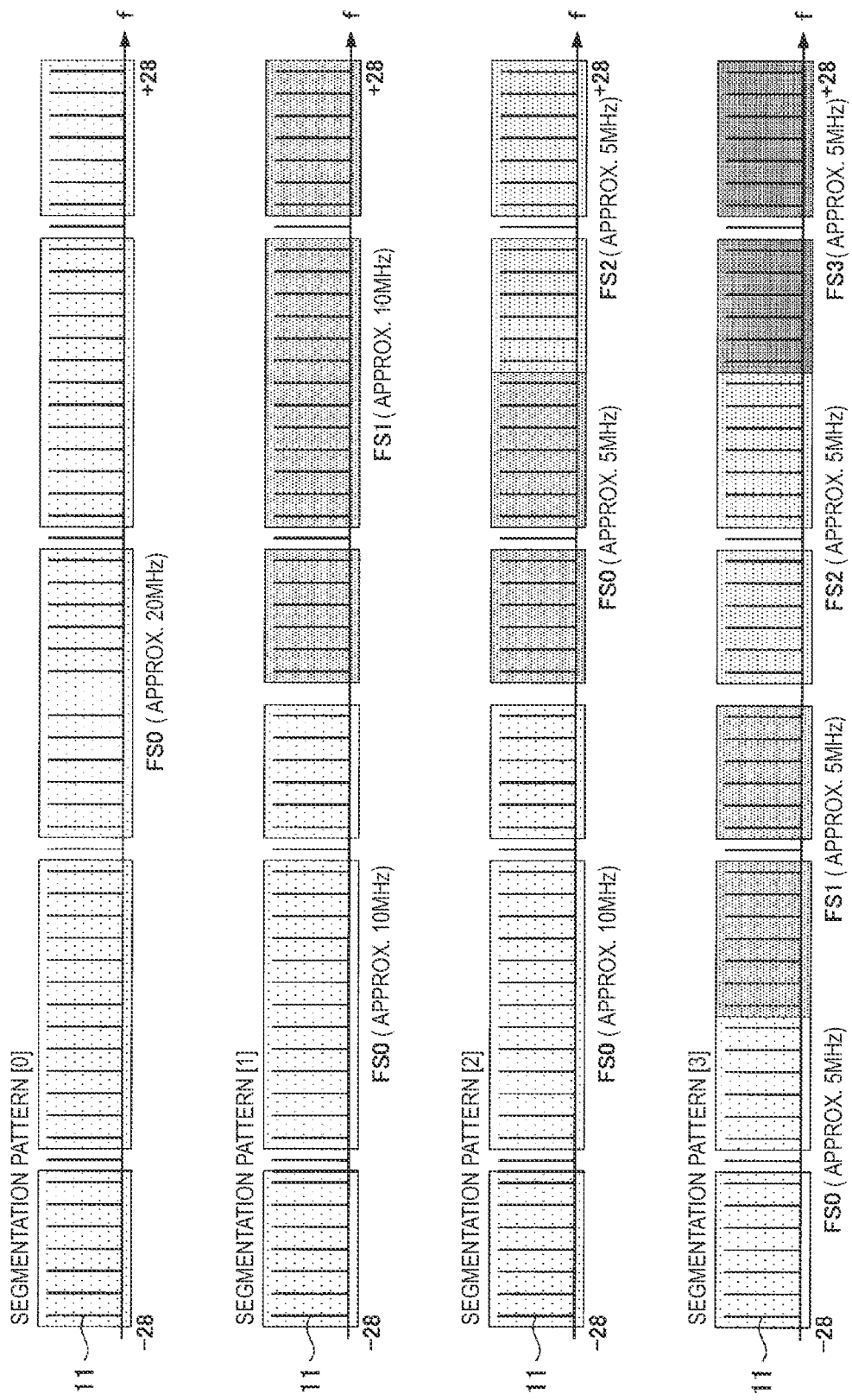

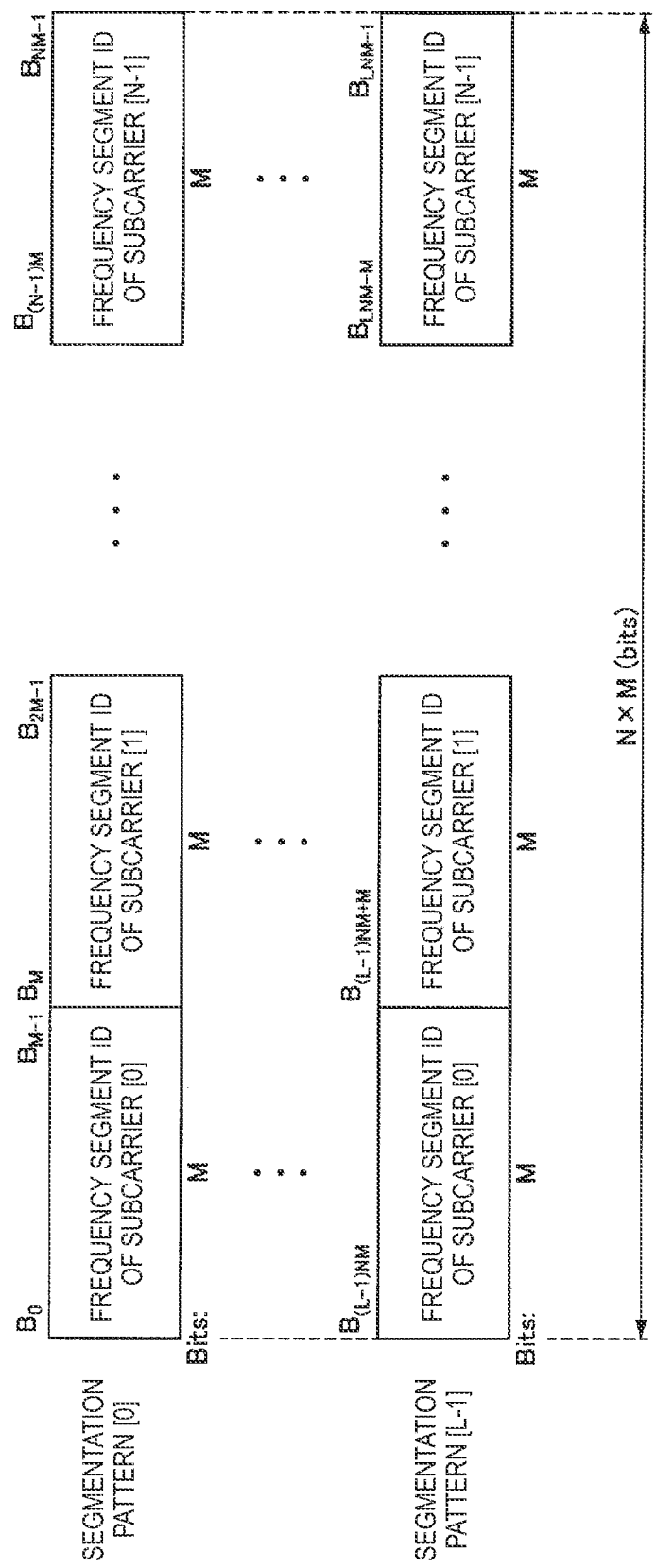

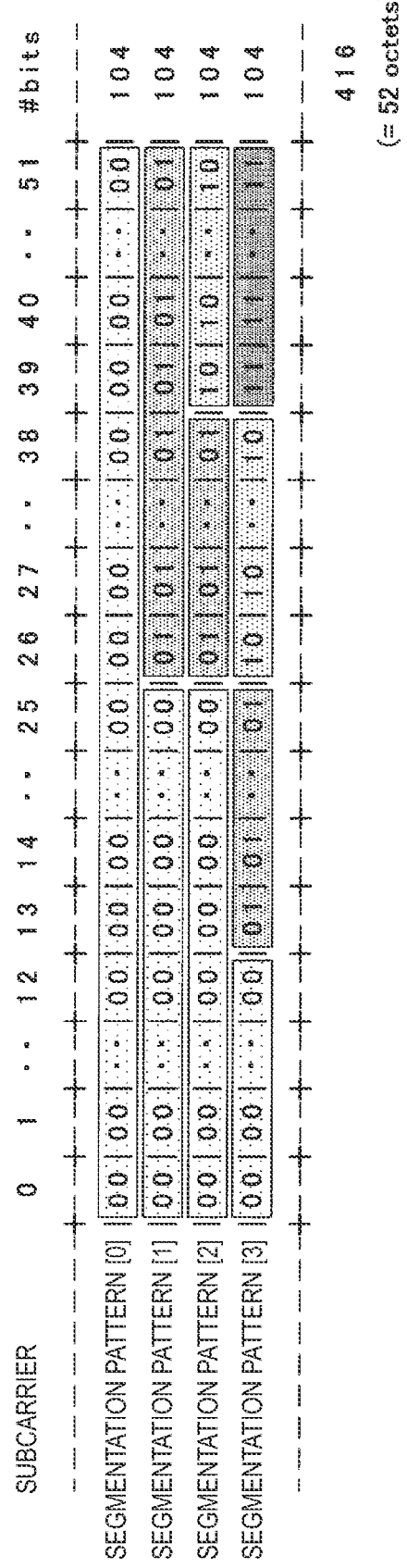

FIG.7

| Bits: | 6 | 6 | 6 | 6 |
|---|---|---|---|---|
| B0 | B5 B6 | B11 B12 | B17 B18 | B23 |
| OFDMA USER ID OF GROUP ID : 0 AT USER POSITION: '00' | OFDMA USER ID OF GROUP ID : 0 AT USER POSITION: '01' | OFDMA USER ID OF GROUP ID : 0 AT USER POSITION: '10' | OFDMA USER ID OF GROUP ID : 0 AT USER POSITION: '11' |

⋮

| Bits: | 6 | 6 | 6 | 6 |
|---|---|---|---|---|
| B1512 | B1517 B1518 | B1523 B1524 | B1529 B1530 | B1535 |
| OFDMA USER ID OF GROUP ID : 63 AT USER POSITION: '00' | OFDMA USER ID OF GROUP ID : 63 AT USER POSITION: '01' | OFDMA USER ID OF GROUP ID : 63 AT USER POSITION: '10' | OFDMA USER ID OF GROUP ID : 63 AT USER POSITION: '11' |

FIG.12

| Composite Name: | BW | SU/MU[0] OFDMA | STBC | Group ID | NSTS/Partial AID | | | | TXOP_PS_NOT_ALLOWED | Reserved |
|---|---|---|---|---|---|---|---|---|---|---|
| SU Name: | | | | | SU NSTS | | | | | |
| MU Name: | | | | | MU[0] NSTS | MU[1] NSTS | MU[2] NSTS | MU[3] NSTS | | |
| | | | | | | Partial AID | | | | |
| Bits: | 2 | 1 | 1 | 6 | 3 | 3 | 3 | 3 | 1 | 1 |
| | B0 B1 | B2 | B3 | B4 ... B9 | B10 ... B12 | B13 ... B15 | B16 ... B18 | B19 ... B21 | B22 | B23 |

FIG. 14

| Field | VHT MU PPDU Allocation (bits) | | | VHT SU PPDU Allocation (bits) | | | Description |
|---|---|---|---|---|---|---|---|
| | 20 MHz | 40 MHz | 80 MHz, 160 MHz, 80+80 MHz | 20 MHz | 40 MHz | 80 MHz, 160 MHz, 80+80 MHz | |
| VHT-SIG-B Length | | | | B0-B16 (17) | B0-B18 (19) | B0-B20 (21) | |
| VHT-MCS | | NOT SHOWN | | N/A | N/A | N/A | |
| OFDMA | | | | B17 (1) | B19 (1) | B21 (1) | 0: OFDMA-SIG FOLLOWS 1: NORMAL VHT SIGNAL |
| Reserved | | | | B18-B19 (2) | B20 (1) | B22 (1) | All ones |
| Tail | | | | B20-B25 (6) | B21-B26 (6) | B23-B28 (6) | All zeros |
| Total # bits | | | | 26 | 27 | 29 | |

WIRELESS COMMUNICATION DEVICE AND METHOD OF WIRELESS COMMUNICATION FOR IMPROVING THE UTILIZATION EFFICIENCY OF RADIO RESOURCES

CROSS-REFERENCE TO RELATED APPLICATIONS

The present application is a continuation application of U.S. patent application Ser. No. 15/521,291, filed Apr. 22, 2017, which is a national stage application under 35 U.S.C. § 371 of International Application No. PCT/JP2015/071806, filed Jul. 31, 2015, and claims the benefit of priority from prior Japanese Patent Application JP 2014-223082, filed Oct. 31, 2014, the entire content of which is hereby incorporated by reference. Each of the above-referenced applications is hereby incorporated herein by reference in its entirety.

TECHNICAL FIELD

The present disclosure relates to a wireless communication device and a method of wireless communication.

BACKGROUND ART

Recent wireless communication environments are faced with the problem of a rapid increase in data traffic. Thus, IEEE 802.11 that is one of the standards related to wireless local area network (LAN) employs technology such as multi-user multiple-input multiple-output (MU-MIMO) as disclosed in Non-Patent Literature 1 below to achieve high-speed wireless communication environment.

In the wireless LAN system, a scheme called carrier sense multiple access with collision avoidance (CSMA/CA) is spreading as one of techniques for avoiding collision. CSMA/CA is a process of checking that another wireless terminal is not transmitting on the frequency channel to be used. A wireless terminal performs wireless transmission when another terminal is not transmitting, and is prevented from performing wireless transmission when the other terminal is transmitting.

CITATION LIST

Non-Patent Literature

Non-Patent Literature 1: "IEEE Std 802.11ac-2013", IEEE STANDARDS ASSOCIATION, [Online], [Search on 20 Oct. 2014], Internet <URL: http://standards.ieee.org/get-IEEE802/download/802.11ac-2013.pdf>

DISCLOSURE OF INVENTION

Technical Problem

In the CSMA/CA described above, the wireless terminal waits for a predetermined time in the case where another wireless terminal is transmitting, checks again that the other wireless terminal is not transmitting on the frequency channel to be used, and performs transmission after a lapse of random time. Thus, regardless of the channel width and the size of transmitted data, one wireless terminal occupies one spatial stream, and there is room for further improvement in the utilization efficiency of radio resources. In particular, upon transmission and reception of small amount of data, it can be said that there is much room for the improvement.

Therefore, the present disclosure provides a novel and improved device and method of wireless communication, capable of improving the utilization efficiency of radio resources by introducing orthogonal frequency-division multiple access (OFDMA) to a wireless LAN system.

Solution to Problem

According to the present disclosure, there is provided a wireless communication device including: a wireless communication unit configured to perform wireless communication with another wireless communication device in accordance with an IEEE 802.11 standard; and a control unit configured to control the wireless communication unit so that the wireless communication unit includes schedule information in a physical layer convergence protocol (PLCP) header defined in the IEEE 802.11 standard and transmits the schedule information to the other wireless communication device, the schedule information relating to orthogonal frequency-division multiple access (OFDMA).

Further, according to the present disclosure, there is provided a wireless communication device including: a wireless communication unit configured to perform wireless communication with another wireless communication device in accordance with an IEEE 802.11 standard; and a control unit configured to acquire schedule information relating to OFDMA from a PLCP header received by the wireless communication unit, the PLCP header being defined in the IEEE 802.11 standard.

Further, according to the present disclosure, there is provided a method of wireless communication in a wireless communication device that performs wireless communication with another wireless communication device in accordance with an IEEE 802.11 standard, the method including: controlling schedule information relating to OFDMA to be included in a PLCP header defined in the IEEE 802.11 standard and to be transmitted to the other wireless communication device.

Further, according to the present disclosure, there is provided a method of wireless communication in a wireless communication device that performs wireless communication with another wireless communication device in accordance with an IEEE 802.11 standard, the method including: acquiring schedule information relating to OFDMA from a PLCP header defined in the IEEE 802.11 standard.

Advantageous Effects of Invention

As described above, according to the present disclosure, it is possible to improve the utilization efficiency of radio resources in the wireless LAN system. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrated to describe an example of radio resource allocation in OFDMA.

FIG. 4 is a diagram illustrated to describe an example of a frequency segmentation pattern according to the present embodiment.

FIG. 5 is a diagram illustrated to describe a channel segmentation array according to the present embodiment.

FIG. 6 is a diagram illustrated to describe a specific example of a channel segmentation array according to the present embodiment.

FIG. 7 is a diagram illustrated to describe an OFDMA user ID array according to the present embodiment.

FIG. 12 is a diagram illustrated to describe an extension example of VHT-SIG-A according to the present embodiment.

FIG. 14 is a diagram illustrated to describe an extension example of VHT-SIG-B according to the present embodiment.

MODE(S) FOR CARRYING OUT THE INVENTION

Figure 1:
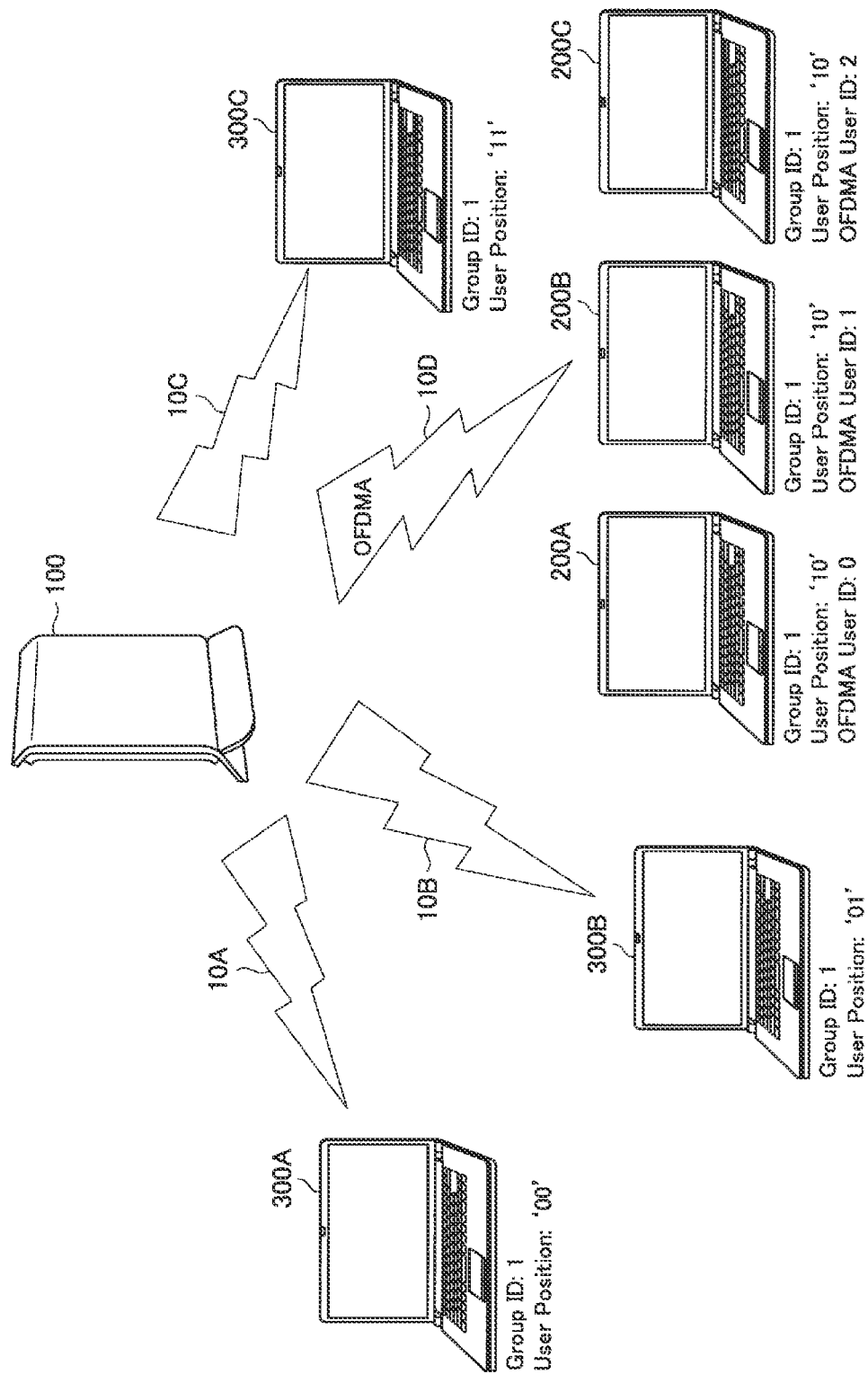
FIG. 1 is a diagram illustrating an overall configuration of a wireless communication system according to the present embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Furthermore, in the present description and drawings, a plurality of elements having substantially the same functional configuration may be distinguished from each other by each of the elements having a different alphabetical letter added to the end of the same reference numeral. For example, a plurality of elements having substantially the same functional configuration may be distinguished from each other as necessary, such as terminal devices 200A, 200B, and 200C. However, if it is not particularly necessary to distinguish each of a plurality of structural elements having substantially the same functional configuration, only the same reference numeral is assigned. For example, if it is not particularly necessary to distinguish between the terminal devices 200A, 200B, and 200C, they are simply referred to as the terminal device 200.

The description will be given in the following order.
1. Overview
2. Configuration
2-1. Configuration Example of Base Station
2-2. Configuration Example of OFDMA Terminal
3. Operation Processing
4. Application Examples
5. Summary

1. OVERVIEW

An overview of a wireless communication system according to an embodiment of the present disclosure is described with reference to FIGS. 1 to 3.

FIG. 1 is a diagram illustrating an overall configuration of the wireless communication system 1 according to the present embodiment. As illustrated in FIG. 1, the wireless communication system 1 includes a base station 100, a terminal device 200, and a terminal device 300.

The terminal device 300 has a function of 802.11ac including MU-MIMO. The 802.11ac is known as very high throughput (VHT). Hereinafter, the terminal device 300 is also referred to as a VHT terminal 300. The terminal device 200 is a wireless communication device having a function of performing wireless communication using OFDMA in addition to the function of 802.11ac. Hereinafter, the terminal device 200 is also referred to as an OFDMA terminal 200.

The base station 100 is a wireless communication device that performs wireless communication with the OFDMA terminal 200 and the VHT terminal 300. The base station 100 simultaneously transmits spatial streams 10 using the function of MU-MIMO. Among them, spatial streams 10A, 10B and 10C are received by VHT terminals 300A, 300B, and 300C, respectively. In addition, a remaining spatial stream 10D is being received by OFDMA terminals 200A, 200B, and 200C. In this regard, the base station 100 performs user multiplexing using OFDMA with respect to the spatial stream 10D. Thus, the OFDMA terminals 200A, 200B, and 200C can receive different data for their respective own terminals by the spatial stream 10D.

In this regard, OFDMA is a scheme based on orthogonal frequency-division multiplexing (OFDM) that performs wireless communication using mutually orthogonal carriers (subcarriers). Each subcarrier is modulated using various schemes such as BPSK/QPSK/16QAM/64QAM/256QAM. In OFDMA, a plurality of users can simultaneously transmit and receive data by partitioning one or more subcarriers by time and allocating them to users. In OFDMA, appropriate allocation of radio resources to each user improves the utilization efficiency of radio resources. In the wireless LAN system, OFDM is introduced, but OFDMA is not employed. Thus, the present embodiment provides a mechanism capable of wireless communication using OFDMA in the wireless LAN system. In the present embodiment, 802.11ac at 5 GHz band is extended.

In the figure, a group ID (Group ID), a user position (User Position), and an OFDMA user ID (OFDMA User ID) are identification information for identifying each terminal device. In one example, the same group ID is allocated to the terminal devices belonging to the same wireless communication system 1. In addition, the same user position is allocated to the terminal device that performs wireless communication using the same spatial stream 10. In addition, OFDMA user IDs allocated to users multiplexed by OFDMA are different.

2. CONFIGURATION

[2-1. Configuration Example of Base Station]

Figure 2:
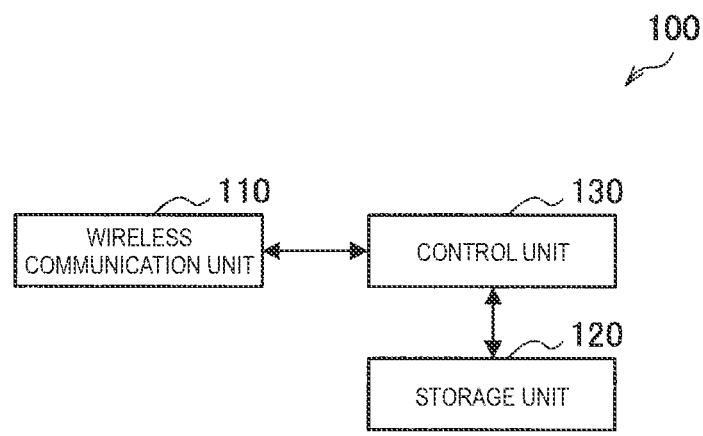
FIG. 2 is a block diagram illustrating an example of a logical configuration of a base station according to the present embodiment.

FIG. 2 is a block diagram illustrating an example of a logical configuration of the base station 100 according to the present embodiment. As illustrated in FIG. 2, the base station 100 is configured to include a wireless communication unit 110, a storage unit 120, and a control unit 130.

(1) Wireless Communication Unit 110

The wireless communication unit 110 is a wireless communication interface that mediates wireless communication with another device by the base station 100. In the present embodiment, the wireless communication unit 110 performs wireless communication with the OFDMA terminal 200 or the VHT terminal 300. In one example, the wireless communication unit 110 receives a wireless signal transmitted from the OFDMA terminal 200 or the VHT terminal 300. The wireless communication unit 110 may have a function as an amplifier, a frequency converter, a demodulator, or the like, and may output, for example, the received data to the control unit 130. Furthermore, the wireless communication unit 110 transmits a wireless signal to the OFDMA terminal 200 or the VHT terminal 300 via an antenna. The wireless communication unit 110 may have a function as a modulator, an amplifier, or the like, and thus may perform modulation or power-amplification on data outputted from the control unit 130 and then transmits it.

The wireless communication unit 110 according to the present embodiment performs wireless communication with another wireless communication device in accordance with the IEEE 802.11 standard. The wireless communication unit 110 may have a function of IEEE 802.11ac, and further has a communication function using OFDMA. In one example, the wireless communication unit 110 performs wireless communication using the specified radio resource (frequency domain and time domain) under the control of the control unit 130.

(2) Storage Unit 120

The storage unit 120 is a portion that stores and reproduces data with respect to various storage media. In one example, the storage unit 120 stores schedule information indicating a result of scheduling by the control unit 130.

(3) Control Unit 130

The control unit 130 according to the present embodiment has a function of controlling wireless communication using OFDMA in the wireless communication system 1. The control unit 130 also has a control function relating to 802.11ac, but a description thereof will be omitted.

(a) Scheduling Function

The control unit 130 has a scheduling function. Specifically, the control unit 130 allocates radio resources to be used by the base station 100 and one or more OFDMA terminals 200. An example of the radio resource allocation in OFDMA is described with reference to FIG. 3.

FIG. 3 is a diagram illustrated to describe an example of radio resource allocation in OFDMA. FIG. 3 illustrates an example of subcarriers 11 forming a 40 MHz frequency channel. The control unit 130 allocates one or more subcarriers 11 to each of the OFDMA terminals 200 to perform uplink communication or downlink communication with each of the OFDMA terminals 200. In the present embodiment, the control unit 130 allocates one or more of frequency segments (FSs) FS0 to FS7 to each of the OFDMA terminals 200. One or more subcarriers 11 belong to the frequency segment. The frequency segment may be a set of one or more consecutive subcarriers 11 that are adjacent to each other, or may be a set of one or more nonconsecutive subcarriers 11 that are not adjacent to each other. In one example, in the example illustrated in FIG. 3, the frequency segment FS0 is a set of subcarriers 11A, 11B, and 11C that are adjacent to each other. Moreover, subcarriers 11D, 11E, and 11F are pilot subcarriers, and none of them belongs to a frequency segment.

The control unit 130 sets one or more frequency segmentation patterns to allocate frequency segments. The segmentation pattern is a pattern used to divide one or more subcarriers 11 forming a frequency channel into one or more frequency segments. In allocating frequency segments, the control unit 130 selects one to be used among one or more segmentation patterns. Then, the control unit 130 divides one or more subcarriers 11 forming a frequency channel into one or more frequency segments using the selected segmentation pattern. Then, the control unit 130 performs scheduling using the divided frequency segments. An example of this segmentation pattern is described with reference to FIG. 4.

FIG. 4 is a diagram illustrated to describe an example of a frequency segmentation pattern according to the present embodiment. FIG. 4 illustrates four segmentation patterns used to divide a plurality of subcarriers 11 forming a frequency channel of 20 MHz into one or more frequency segments. These four segmentation patterns are represented by segmentation patterns [0]-[3]. As illustrated in FIG. 4, in the frequency segment [0], one frequency segment FS0 includes all the subcarriers 11 other than the pilot subcarriers. In the segmentation pattern [1], the subcarriers 11 are divided into frequency segments FS0 and FS1 by approximately 10 MHz each. In the segmentation pattern [2], the subcarriers 11 are divided into the frequency segment FS0 by approximately 10 MHz, and into frequency segments FS1 and FS2 by approximately 5 MHz each. In the segmentation pattern [3], the subcarriers 11 are divided into frequency segments FS0, FS1, FS2, and FS3 by approximately 5 MHz each.

The control unit 130 can set various segmentation patterns. In one example, as shown in Table 1 below, the control unit 130 may change the number of segmentation patterns depending on the channel width of available frequencies. Furthermore, the control unit 130 may change the maximum number of frequency segments depending on the channel width. Moreover, in the example shown in Table 1, assuming that the length of a pattern ID is M bits, the number of segmentation patterns is $2^M$.

TABLE 1

| Bandwidth | Example of Number of Segmentation Patterns (Length of Pattern ID) |
|---|---|
| 20 MHz | 4 Patterns (2 Bits) |
| 40 MHz | 8 Patterns (3 Bits) |
| 80 MHz | 16 Patterns (4 Bits) |
| 160 MHz | 32 Patterns (5 Bits) |
| 80 + 80 MHz | 32 Patterns (5 Bits) |

Alternatively, the control unit 130 may perform allocation concerning modulation scheme, coding scheme, transmission power level, or the like as another example of scheduling.

(b) Schedule Information Notification Function

The control unit 130 has a function of notifying the schedule information indicating a result of scheduling. An example of the schedule information includes information that contains information indicating a candidate for segmentation pattern, segmentation pattern identification information, and resource block information, which will be described later. There are various ways of notifying the schedule information. The base station 100 according to the present embodiment notifies each of the OFDMA terminals 200 of information indicating a candidate for a segmentation pattern that can be used in common in the wireless communication system 1. Then, the base station 100 notifies each of the OFDMA terminals 200 of a segmentation pattern to be used for data communication with each of the OFDMA terminals 200 and the information indicating the frequency segment. These pieces of information are notified, for example, by using an action frame or a physical layer convergence protocol (PLCP) header defined in the IEEE 802.11 standard.

(b-1) Segmentation Pattern Candidate Notification

The control unit 130 controls the wireless communication unit 110 so that the wireless communication unit 110 may transmit an action frame including one or more frequency segmentation patterns to another wireless communication device. In one example, the control unit 130 controls the wireless communication unit 110 so that the wireless communication unit 110 may transmit an action frame including one or more candidates for a segmentation pattern that can be used in common in the wireless communication system 1 to each of the OFDMA terminal 200. Hereinafter, this action frame is also referred to as a channel segmentation management frame. Table 2 below shows an example of the format of the channel segmentation management frame.

TABLE 2

| Order | Information |
|---|---|
| 1 | Category |
| 2 | OFDMA Action |
| 3 | Channel Segmentation Array |

The channel segmentation management frame includes a category, an OFMDA action, and a channel segmentation array as shown in Table 2 above. The OFDMA action is information indicating that it is an action frame relating to OFDMA. The channel segmentation array is information including one or more candidates for a segmentation pattern that can be used in common in the wireless communication system 1. The contents of the channel segmentation array are described with reference to FIG. 5.

FIG. 5 is a diagram illustrated to describe the channel segmentation array according to the present embodiment. As illustrated in FIG. 5, the channel segmentation array is information in which pieces of information where the frequency segment IDs of respective subcarriers are placed are arranged for each segmentation pattern. Moreover, the frequency segment ID is the identification information of the frequency segment to which each subcarrier belongs. The channel segmentation array may be configured without a frequency segment ID of the pilot subcarrier. Assuming that the number of subcarriers other than the pilot subcarriers is N and the frequency segment ID is M bits, the number of bits in the column direction of the channel segmentation array is N×M bits. In addition, assuming that the number of segmentation patterns is L, the size of the channel segmentation array is L×N×M bits. A specific example of the channel segmentation array is described with reference to FIG. 6.

FIG. 6 is a diagram illustrated to describe a specific example of the channel segmentation array according to the present embodiment. FIG. 6 illustrates a bit string of a channel segmentation array pertaining to four segmentation patterns (L=4), which divides 20 MHz channels composed of 52 subcarriers into up to 4 segments (M=2). In this figure, "00", "01", "10", and "11" are frequency segment IDs. The channel segmentation array shown in FIG. 6 represents segmentation patterns [0] to [3] shown in FIG. 4. In one example, the segmentation pattern [3] shown in FIG. 6 is divided into four sets of frequency segments, that is, subcarriers [0] to [12], subcarriers [13] to [25], subcarriers [26] to [38], subcarriers [39] to [51]. As illustrated in FIG. 6, this representation of segmentation patterns by a bit string makes it possible for a frequency segment to represent as a set of one or more consecutive subcarriers that are adjacent to each other or as a set of one or more nonconsecutive subcarriers that are not adjacent to each other.

Moreover, the control unit 130 can change the segmentation pattern at any time. In the case where there is a change in the segmentation pattern, the channel segmentation management frame is retransmitted. On the other hand, in the case where there is no change in the segmentation pattern, the channel segmentation management frame is not retransmitted. This may reduce the amount of signaling concerning the notification of the segmentation pattern.

(b-2) Notification of Segmentation Pattern to Use

In one example, the control unit 130 controls the wireless communication unit 110 so that the wireless communication unit 110 may perform notification of segmentation pattern identification information indicating one segmentation pattern to be used among one or more segmentation patterns. Specifically, the control unit 130 determines a segmentation pattern to be used from candidates for the segmentation pattern notified using the channel segmentation management frame, and notifies each of the OFDMA terminals 200 of the segmentation pattern identification information indicating the determined segmentation pattern. This segmentation pattern identification information is used in common for users multiplexed by OFDMA. This makes it possible for the segmentation patterns used in the wireless communication system 1 to have in common and for redundant allocation of radio resources radio resources to be prevented. The segmentation pattern identification information can be included in a PLCP header described later as one piece of the schedule information.

In this regard, the information indicating all candidates for the segmentation pattern is stored in the channel segmentation array, and thus it can be several hundred to several thousand octets in total. According to the present embodiment, the base station 100 notifies the channel segmentation management frame once and then transmits segmentation pattern identification information (several bits as shown in "CS Pattern" in Table 5 to be described later), thereby notifying the segmentation pattern to be used. This can reduce the amount of signaling.

(b-3) Notification of Frequency Segment to Use

In one example, the control unit 130 controls the wireless communication unit 110 so that the wireless communication unit 110 may notify information indicating at least one of the frequencies divided by the segmentation pattern indicated by the segmentation pattern identification information (to-be-used frequency information). Specifically, the control unit 130 notifies each of the OFDMA terminals 200 of the to-be-used frequency information, which indicates a frequency segment used for data communication with each of the OFDMA terminals 200 among frequency segments divided by the segmentation pattern determined to be used in common in the wireless communication system 1. This to-be-used frequency information differs between users multiplexed by OFDMA. This allows the radio resources allocated to the OFDMA terminal 200 belonging to the wireless communication system 1 to be different from each other, thereby reducing interference. The to-be-used frequency information can be included in the PLCP header described later as one piece of the schedule information.

(c) Identification Information Allocation and Notification Functions

The control unit 130 has a function of allocating identification information to each of the OFDMA terminals 200. In one example, the control unit 130 allocates identification information including a triplet (set of three) of a group ID, a user position, and an OFDMA user ID to each of the OFDMA terminals 200. Moreover, the OFDMA user ID is identification information (OFDMA identification information) for identifying a specific OFDMA terminal 200 from users multiplexed by OFDMA. The control unit 130 allocates different OFDMA user IDs to users multiplexed by OFDMA. The OFDMA terminal 200 is distinguished uniquely by the identification information composed of this triplet. The control unit 130 may allocate a plurality of pieces of identification information to one of the OFDMA terminals 200.

The control unit 130 has a function of notifying each of the OFDMA terminals 200 of the allocated identification information. In one example, the control unit 130 controls the wireless communication unit 110 so that the wireless communication unit 110 may transmit an action frame, which includes one or more OFDMA user IDs allocated to another wireless communication device, to the other wireless communication device. The OFDMA user ID allocated to each of the OFDMA terminals 200 is different, and thus different action frames are transmitted to each of the OFDMA terminals 200. In one example, the control unit 130 may use a frame obtained by extending the group ID management frame in 802.11ac as this action frame. Hereinafter, this action frame is also referred to as an OFDMA group ID management frame. Table 3 below shows an example of the format of the OFDMA group ID management frame.

TABLE 3

| Order | Information |
| --- | --- |
| 1 | Category |
| 2 | OFDMA Action |

TABLE 3-continued

| Order | Information |
| --- | --- |
| 3 | Membership Status Array |
| 4 | User Position Array |
| 5 | OFDMA User ID Array |

The OFDMA group ID management frame includes a category, an OFMDA action, a membership status array, a user position array, and an OFDMA user ID array, as shown in Table 3 above. The membership status array is information indicating the group ID allocated to the terminal device of the destination of the OFDMA group ID management frame. The user position array is information indicating the user position allocated to the terminal device of the destination of the OFDMA group ID management frame. The OFDMA user ID array is information indicating the OFDMA user ID allocated to the terminal device of the destination of the OFDMA group ID management frame. The contents of the OFDMA user ID array are described with reference to FIG. 7.

FIG. 7 is a diagram illustrated to describe the OFDMA user ID array according to the present embodiment. As illustrated in FIG. 7, the OFDMA user ID array is information in which allocable OFDMA user IDs are arranged for all combinations of group IDs and user positions. In 802.11ac, 64 group IDs (0 to 63) can be set, and four user positions ("00" to "11") can be set for each group ID. Assuming that the OFDMA user ID is, for example, 6 bits, the size of the OFDMA user ID array is 64×4×6=1536 bits (=192 octets). In the OFDMA user ID array, the OFDMA user ID to be allocated is described in the 6-bit subfield corresponding to the group ID and the user position to which the terminal device belongs. On the other hand, in the OFDMA user ID array, an invalid value indicating that it does not belong is described in the 6-bit subfield corresponding to the group ID and the user position to which the terminal device does not belong. Table 4 below shows an example of a subfield value of the OFDMA user ID.

TABLE 4

| OFDMA User ID Subfield Value | User ID | Description |
| --- | --- | --- |
| 000000 | 0 | |
| 000001 | 1 | |
| 000010 | 2 | |
| 000011 | 3 | At 20 MHz, up to four users (lower 2 bits) are valid |
| 000100 | 4 | |
| . | . | |
| . | . | |
| . | . | |
| 000111 | 7 | At 40 MHz, up to eight users (lower 3 bits) are valid |
| 001000 | 8 | |
| . | . | |
| . | . | |
| . | . | |
| 001111 | 15 | At 80 MHz, up to 16 users (lower 4 bits) are valid |
| 010000 | 16 | |
| . | . | |
| . | . | |
| 011111 | 31 | At 160 MHz, up to 32 users (lower 5 bits) are valid |

TABLE 4-continued

| OFDMA User ID Subfield Value | User ID | Description |
| --- | --- | --- |
| 100000~111110 | 32~62 | Reserved |
| 111111 | 63 | Not belong to relevant group/user position |

In this way, in the OFDMA user ID array, it is possible to specify the OFDMA user ID to be allocated for all combinations of the group ID and the user position. Thus, the control unit 130 can allocate a plurality of pieces of identification information including a combination of the group ID, the user position, and the OFDMA user ID to one of the OFDMA terminals 200.

The valid area (number of bits) of the OFDMA user ID may be limited depending on the channel width to be used. In one example, in the case where the channel width is narrow (e.g., 20 MHz), the maximum number of users may be limited to four users, and the valid bits may be limited to the lower 2 bits. In addition, in the case where the channel width is wide (e.g., 160 MHz), the maximum number of users may be limited to 32 users, and the valid bits may be limited to the lower 5 bits.

Moreover, the control unit 130 can change the identification information of the OFDMA terminal 200 at any time. In the case where there is a change in the identification information, the OFDMA group ID management frame is retransmitted. On the other hand, in the case where there is no change in the identification information, the OFDMA group ID management frame is not retransmitted. This makes it possible to reduce the amount of signaling concerning the notification of the identification information.

(d) PLCP Header

The control unit 130 controls the wireless communication unit 110 so that the wireless communication unit 110 may include the schedule information relating to the OFDMA in the physical layer convergence protocol (PLCP) header and transmit it to another wireless communication device. In one example, the control unit 130 controls the wireless communication unit 110 so that the wireless communication unit 110 may include the segmentation pattern identification information and the to-be-used frequency information described above in the PLCP header and may transmit it to each of the OFDMA terminals 200.

Then, the control unit 130 controls the wireless communication unit 110 so that the wireless communication unit 110 may perform wireless communication using OFDMA in accordance with the schedule information with another wireless communication device. In one example, the control unit 130 controls the wireless communication unit 110 so that the wireless communication unit 110 may perform downlink communication or uplink communication with the OFDMA terminal 200 using the frequency segment indicated by the segmentation pattern identification information and the to-be-used frequency information, which are included in the PLCP header and notified to the OFDMA terminal 200. A specific example of radio resource allocation according to the present embodiment is described with reference to FIG. 8.

Figure 8:
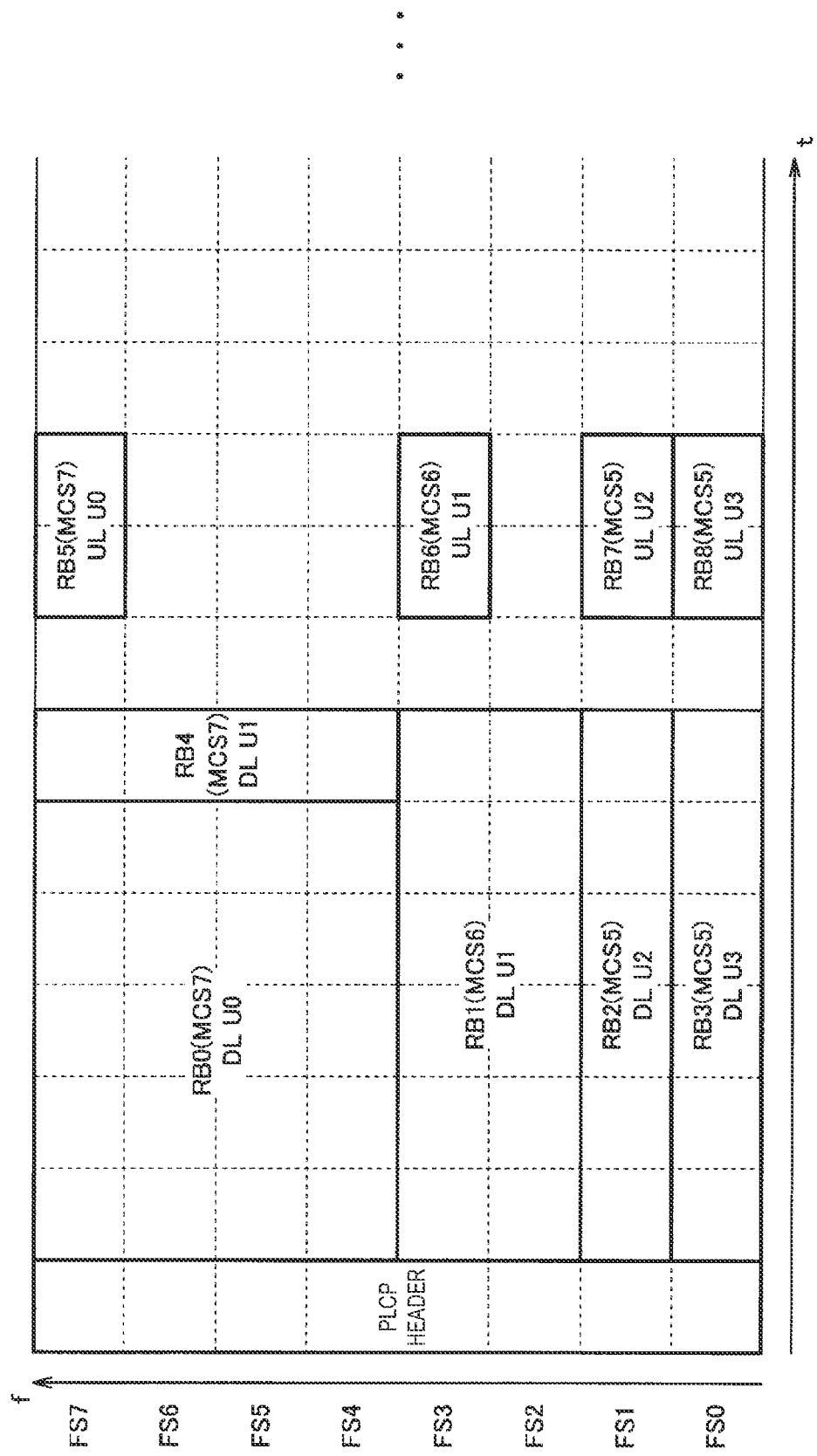
FIG. 8 is a diagram illustrated to describe wireless access according to the present embodiment.

FIG. 8 is a diagram illustrated to describe wireless access according to the present embodiment. FIG. 8 illustrates an example of allocation of radio resources, where the horizontal axis is time and the vertical axis is frequency segment. The frequency segment on the vertical axis in FIG. 8 corresponds to the eight frequency segments FS0 to FS7 shown in FIG. 1. As illustrated in FIG. 8, the control unit 130 notifies each of the OFDMA terminals 200 of the PLCP header by using all the frequency segments. Then, as illustrated in FIG. 8, downlink communication or uplink communication is performed between the base station 100 and the OFDMA terminal 200 in a frequency segment and a time zone specified by the PLCP header. The radio resource used for data transmission and reception with each of the OFDMA terminals 200, which is specified by the frequency segment and the time zone, is also referred to as a resource block (RB) and is represented by RB in the figure. In the figure, U0 to U3 indicate identification information of each of the OFDMA terminals 200 connected to the base station 100. Furthermore, in the figure, DL indicates downlink communication and UL indicates uplink communication. In the figure, MCS indicates modulation and coding scheme. According to FIG. 8, in one example, the base station 100 carries out modulation and coding indicated by the MCS7 and performs downlink communication to the OFDMA terminal U0 using RB0. In addition, the base station 100 carries out modulation and coding indicated by the MCS7 and performs downlink communication to the OFDMA terminal U1 using RB4.

(d-1) PLCP Header Format

Figure 9:
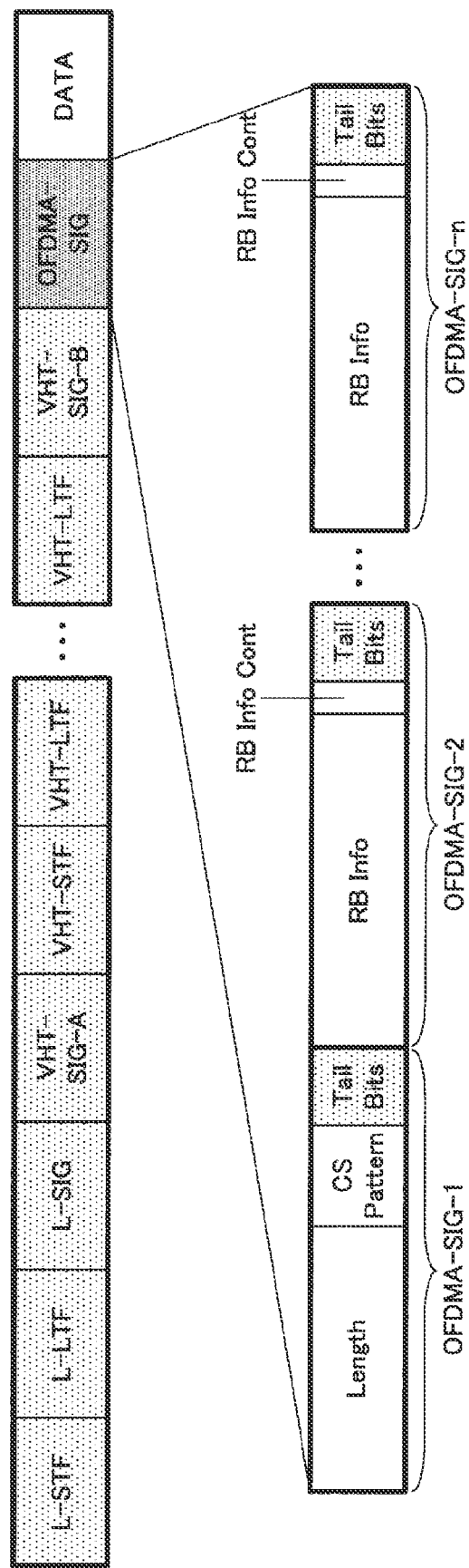
FIG. 9 is a diagram illustrating an example of a PPDU format according to the present embodiment.

FIG. 9 is a diagram illustrating an example of a format of a physical layer protocol data unit (PPDU) including the PLCP header according to the present embodiment. As illustrated in FIG. 9, the PLCP header according to the present embodiment includes a legacy field, a field for an 802.11ac compatible terminal, and a field for an OFDMA compatible terminal. The legacy fields are L-STF, L-LTF, and L-SIG. The fields for the 802.11ac compatible terminal are VHT-SIG-A, VHT-STF, VHT-LTF, and VHT-SIG-B. In addition, the field for OFDMA compatible terminal is OFDMA-SIG. The OFDMA-SIG is a packet relating to OFDMA including schedule information, such as the segmentation pattern identification information described above and one or more pieces of resource block information (including OFDMA user ID and to-be-used frequency information) to be described later. The schedule information, which is included in the PLCP header such as segmentation pattern identification information or resource block information, is transmitted using an OFDMA-SIG packet. As illustrated in FIG. 9, the PLCP header may include n (≥1) packets, such as OFDMA-SIG-1, OFDMA-SIG-2, . . . , OFDMA-SIG-n. In the following description, OFDMA-SIG-1 to OFDMA-SIG-n are collectively referred to as OFDMA-SIG, unless they are particularly necessary to distinguish.

Fields included in the OFDMA-SIG are described. Length is a field for storing information indicating the length of OFDMA-SIG-1 to OFDMA-SIG-n. CS Pattern (channel segmentation pattern) included in OFDMA-SIG-1 is a field for storing segmentation pattern identification information. In this way, the base station 100 can specify the segmentation pattern to be used each time data transmission is performed, and can change it each time data is transmitted. Tail Bits is fields for storing information indicating termination. RB Info (resource block information) is resource block information to be described later. As illustrated in FIG. 9, one or more of RB Info are stored and transmitted in the OFDMA-SIG-2 and subsequent packets. RB Info Cont (resource block information continue) is information indicating whether another OFDMA-SIG to follows. In one example, "1" is described in the RB Info Cont in the case where another OFDMA-SIG follows, but "0" is described in the RB Info Cont in the case where no OFDMA-SIG follows. In one example, "1" is described in the RB Info Cont included in OFDMA-SIG-2 because OFDMA-SIG-2 is followed by OFDMA-SIG-3. On the other hand, "0" is described in the RB Info Cont included in OFDMA-SIG-n because OFDMA-SIG-n is the last packet. This makes it possible for the receiving side to know that data transmission and reception are performed following the OFDMA-SIG in which the RB Info Cont is "0". Table 5 below shows an example of the bit length of each field.

TABLE 5

| | OFDMA-SIG-1 | | | | OFDMA-SIG-2-n | | | |
|---|---|---|---|---|---|---|---|---|
| Channel Width (MHz) | Length (Bits) | CS Pattern (Bits) | Tail Bits (Bits) | Total (Bits) | RB Info (Bits) | RB Info Cont (Bits) | Tail Bits (Bits) | Total (Bits) |
| 20 | 18 | 2 | 6 | 26 | 19 | 1 | 6 | 26 |
| 40 | 18 | 3 | 6 | 27 | 20 | 1 | 6 | 27 |
| 80 | 19 | 4 | 6 | 29 | 22 | 1 | 6 | 29 |
| 160/80 + 80 | 18 | 5 | 6 | 29 | 22 | 1 | 6 | 29 |

As shown in Table 5 above, the bit length of each field may be variable depending on the channel width. The size of OFDMA-SIG is 26 bits at 20 MHz, 27 bits at 40 MHz, 29 bits at 80 MHz, and 29 bits at 160/80+80 MHz. These sizes are determined in consideration of the number of bits per symbol. These sizes are similar to the case of VHT-SIG-B. Of course, the size of the OFDMA-SIG may be any size other than these, and the size of each field may be any size.

(d-2) Resource Block Information

Resource block information is described. The resource block information is information relating to a resource block used in wireless communication with another wireless communication device. The PLCP header includes one or more pieces of resource block information as schedule information. Table 6 below shows an example of information included in the resource block information.

TABLE 6

| Field Name | Number of Bits | Description |
|---|---|---|
| UL_DL | 1 | 1: Uplink, 0: Downlink |
| OFDMA_User_ID | N | Identification Information of Target User |
| Frequency_Segment | M | Bit corresponding to FS to use: [1] Bit corresponding to FS not to use: [0] |
| Start_Radio_Frame_Number | 8 | Data Transmission Start Time |
| Duration | 8 | Data Transmission Duration (Number of radio frame to be allocated) |
| MCS | 4 | MCS of Data (0-9) |
| Tx_Power_Level | 3 | Data Transmission Power Level (0-7) |

The number of bits of each field shown in Table 6 above is an example, and it may be any number of bits other than the above. Each field shown in Table 6 is described below.

UL_DL

This field is a field for storing information indicating whether the communication performed using the radio resource indicated by the resource block information is uplink communication or downlink communication.

OFDMA_User_ID

This field is a field for storing the OFDMA user ID. The number of bits, N, may be variable depending on the channel width as described above.

Frequency_Segment

This field is a field for storing the to-be-used frequency information, which indicates a frequency segment used for data communication with the OFDMA terminal 200 specified by OFDMA_User_ID. The to-be-used frequency information is specified by, for example, a bitmap. In one example, among bit strings in which the number of frequency segments is the bit length, "1" is described in the bit corresponding to the frequency segment to be used and "0" is described in the bit corresponding to the frequency segment not to be used. The number of frequency segments may be variable depending on the channel width as described above. Thus, the number M of bits of this field may also be variable depending on the maximum number of frequency segments.

Start_Radio_Frame_Number

This field is a field for storing information indicating the time slot number at which the resource block indicated by the resource block information starts.

Duration

This field is a field for storing information indicating the number of time slots used by the resource block indicated by the resource block information.

MCS

This field is a field for storing information indicating the index of modulation and coding schemes. In transmitting or receiving data using the resource block indicated by the resource block information, the base station 100 or the OFDMA terminal 200 performs modulation and coding using a modulation scheme and a coding scheme, respectively, corresponding to the index. In 802.11ac, 0 to 9 can be used, but this is not applied to the case where a combination of usable modulation and coding schemes increases.

Tx_Power_Level:

This field is a field for storing information indicating the level of transmission power in data communication performed using the resource block indicated by the resource block information.

The contents of the resource block information have been described. Then, the relationship between the size of the resource block information and the OFDMA-SIG is described. Table 7 below shows an example of the size of each field of resource block information in each channel width.

TABLE 7

| | Number of Bits (Bits) | | | |
|---|---|---|---|---|
| Field Name | 20 MHz | 40 MHz | 80 MHz | 160/80 + 80 MHz |
| UL_DL | 1 | 1 | 1 | 1 |
| OFDMA_User_ID | 2 | 3 | 4 | 5 |
| Frequency_Segment | 4 | 8 | 16 | 32 |
| Start_Radio_Frame_Number | 8 | 8 | 8 | 8 |
| Duration | 8 | 8 | 8 | 8 |
| MCS | 4 | 4 | 4 | 4 |
| Tx_Power_Level | 3 | 3 | 3 | 3 |
| Total | 30 | 35 | 44 | 61 |

The number of bits of "OFDMA_User_ID" and "Frequency_Segment" shown in Table 7 above is an example, and any number of bits other than the above may be used.

One or more pieces of resource block information may be included in one PLCP header. In addition, a case where the size of the resource block information exceeds the size of one OFDMA-SIG may be considered. In this case, one piece of resource block information may be transmitted using one or a plurality of OFDMA-SIGs in succession. On the other hand, a case where the size of one piece of resource block information or the size of the last of the resource block information transmitted using a plurality of OFDMA-SIGs is less than the size of one OFDMA-SIG is considered. In this case, one OFDMA-SIG contains one piece of resource block information. In other words, one OFDMA-SIG does not contain two or more pieces of resource block information (relating to two or more resource blocks). The relationship between the size of the resource block information and the OFDMA-SIG in the case where the channel width is 40 MHz is described with reference to FIGS. 10 and 11.

Figure 10:
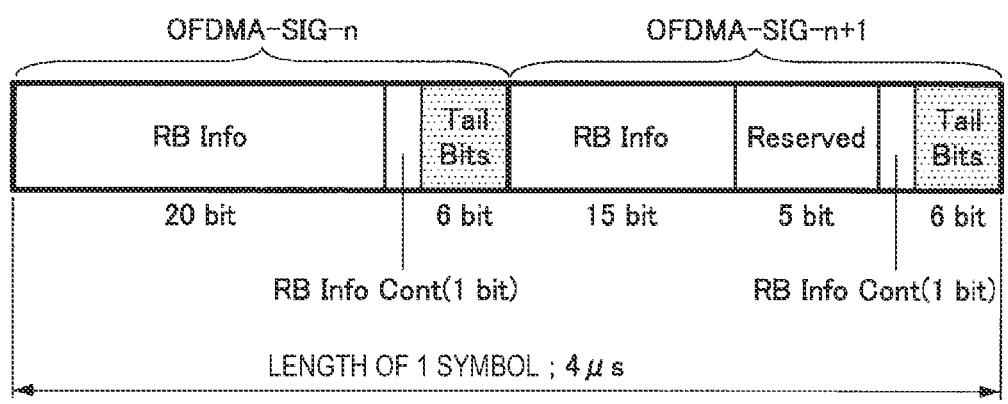
FIG. 10 is a diagram illustrated to describe the relationship between the size of resource block information and OFDMA-SIG.

FIG. 10 is a diagram illustrated to describe the relationship between the size of resource block information and OFDMA-SIG. As illustrated in FIG. 10, one piece of resource block information can be divided to be stored in two OFDMA-SIGs. According to Table 5 above, the resource block information that can be stored in one OFDMA-SIG in the case where the channel width is 40 MHz is 20 bits. In addition, according to Table 7 above, the size of the resource block information in the case where the channel width is 40 MHz is 35 bits. Thus, as illustrated in FIG. 10, 20 bits at the head of the resource block information are stored in OFDMA-SIG-n and the remaining 15 bits are stored in OFDMA-SIG-n+1. Among 20 bits that can be stored in one OFDMA-SIG, 15 bits are used and 5 bits remain. The 5 bits are set as a "Reserved" field in FIG. 10.

Figure 11:
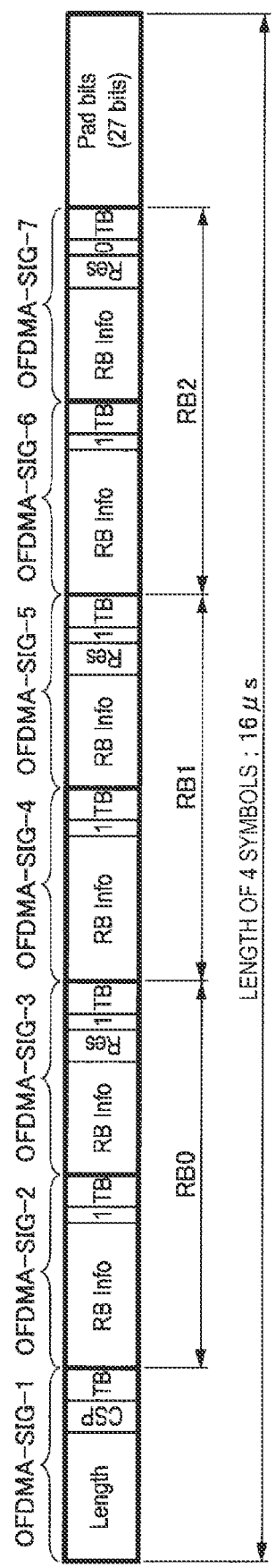
FIG. 11 is a diagram illustrated to describe the relationship between the size of resource block information and OFDMA-SIG.

FIG. 11 is a diagram illustrated to describe the relationship between the size of resource block information and OFDMA-SIG. FIG. 11 illustrates OFMDA-SIG in transmitting three pieces of resource block information (RB0, RB1, and RB2). In FIG. 11, CSP is an abbreviation of "CS Pattern", TB is an abbreviation of "Tail Bits", and Res is an abbreviation of "Reserved". Furthermore, FIG. 11 illustrates "RB Info Cont" as its value directly. In one example, in this field, "1" indicating that there is an OFDMA-SIG to follow is described in OFDMA-SIG-2 to OFDMA-SIG-6, and "0" indicating that there is no OFDMA-SIG to follow is described in OFDMA-SIG-7.

The control unit 130 controls a padding process so that the total size of one or more OFDMA-SIGs included in one frame may be an integer multiple of the number of bits per symbol. In one example, in the case of 40 MHz, the control unit 130 performs the padding process of filling the remaining portion with "Pad bits" so that the total length of the OFDMA-SIG may be an integer multiple of 54 (=27×2: length of one symbol). In the example illustrated in FIG. 11, in the case where there are three resource blocks, OFDMA-SIG includes seven packets (=189 bits) in total including OFDMA-SIG-1. 27×7+27=54×4. Thus, the control unit 130 performs padding of 27 bits. Thus, the total length of OFDMA-SIG is the length of four symbols (=16 μs).

(d-3) Extension of Field for 802.11ac Compatible Terminal

As illustrated in FIG. 9, the PLCP header according to the present embodiment includes the legacy field, the field for an 802.11ac compatible terminal, and the field for an OFDMA compatible terminal. Thus, the present embodiment performs extension for adding information indicating whether OFDMA-SIG follows VHT-SIG-B to the field for the 802.11ac compatible terminal. This makes it possible for the VHT terminal 300, when receiving the PLCP header including OFDMA-SIG, to be prevented from attempting to read OFDMA-SIG erroneously. An example of extension of VHT-SIG-A and addition of the information described above is described with reference to FIGS. 12 and 13.

Extension Example of VHT-SIG-A

Figure 13:
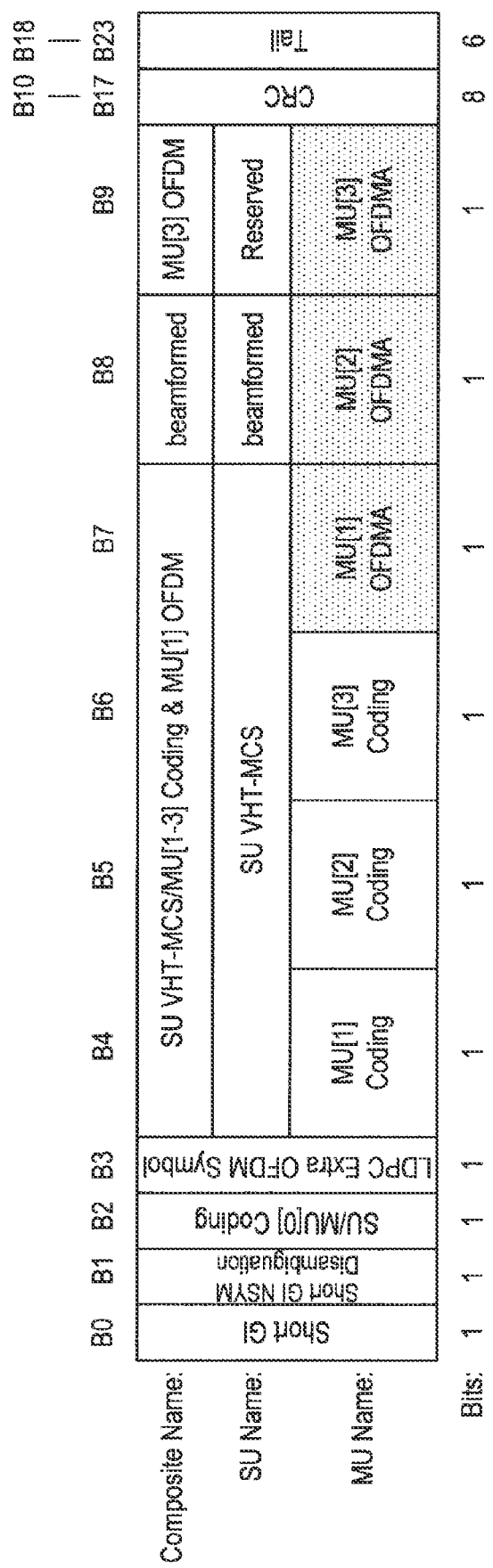
FIG. 13 is a diagram illustrated to describe an extension example of VHT-SIG-A according to the present embodiment.

FIGS. 12 and 13 are diagrams illustrated to describe an extension example of VHT-SIG-A according to the present embodiment. FIG. 12 illustrates a data structure obtained by extending VHT-SIG-A1. FIG. 13 illustrates a data structure obtained by extending VHT-SIG-A2. As illustrated in FIGS. 12 and 13, in the present embodiment, an OFDMA flag is allocated to a place that is "Reserved" by 802.11ac. In one example, the fact that the OFDMA flag is "0" indicates that communication with the target user is performed using OFDMA and the OFDMA-SIG follows the VHT-SIG-B. In addition, the fact that the OFDMA flag is "1" means that communication with the target user is performed without use of OFDMA and data follows the VHT-SIG-B. As illustrated in FIG. 12, in one example, an SU OFDMA flag is allocated to B2 of VHT-SIG-A1 for single user, and an MU[0] OFDMA flag is allocated to B2 of VHT-SIG-A1 for multiusers. Furthermore, as illustrated in FIG. 13, for multiusers, an MU[1] OFDMA flag is allocated to B7 of VHT-SIG-A2, an MU[2] OFDMA flag is allocated to B8 of VHT-SIG-A2, an MU[3] OFDMA flag is allocated to B9 of VHT-SIG-A2. Moreover, MU[n] OFDMA is an OFDMA flag indicating whether communication with the terminal device at the user position n is performed using OFDMA.

In this regard, the control unit 130 allocates a group ID and a user position to the VHT terminal 300 that does not have the OFDMA function so as not to belong to a group that is likely to operate OFDMA. Thus, even if the OFDMA flag is "0", as long as the VHT terminal 300 does not belong to "Group ID" and "User Position" indicated by VHT-SIG-A1 or VHT-SIG-A2, the VHT terminal 300 can avoid trying to read the OFDMA-SIG erroneously. By doing so, it is possible to maintain backward compatibility with the VHT terminal 300, and at the same time, to achieve mixed operation of the MU-MIMO for the VHT terminal 300 and the OFDMA for the OFDMA terminal 200 as illustrated in FIG. 1.

An example of extending VHT-SIG-A has been described. Then, an example of extending VHT-SIG-B is described with reference to FIG. 14.

Extension Example of VHT-SIG-B

FIG. 14 is a diagram illustrated to describe an extension example of VHT-SIG-B according to the present embodiment. As illustrated in FIG. 14, in the present embodiment, the OFDMA flag is allocated to each of places (B17, B19, and B21) that are "Reserved" by 802.11ac. As illustrated in FIG. 14, in extending the VHT-SIG-B, the OFDMA flag is described in each of the channel widths of 20 MHz, 40 MHz, 80 MHz, 160 MHz, or 80+80 MHz bandwidth. In other words, this extension example is effective in the case of a single user.

The configuration example of the base station 100 according to the present embodiment has been described. Then, a configuration example of the OFDMA terminal 200 according to the present embodiment is described with reference to FIG. 15.

[2-2. Configuration Example of OFDMA Terminal]

Figure 15:
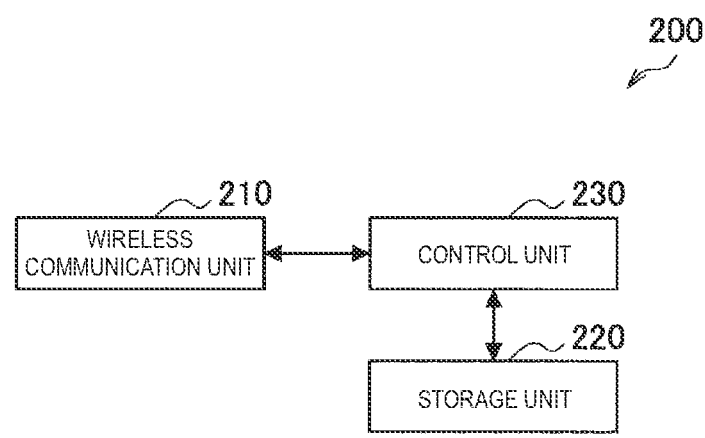
FIG. 15 is a block diagram illustrating an example of a logical configuration of an OFDMA terminal according to the present embodiment.

FIG. 15 is a block diagram illustrating an example of a logical configuration of the OFDMA terminal 200 according to the present embodiment. As illustrated in FIG. 15, the OFDMA terminal 200 is configured to include a wireless communication unit 210, a storage unit 220, and a control unit 230.

(1) Wireless Communication Unit 210

The wireless communication unit 210 is a wireless communication interface that mediates wireless communication with another device by the OFDMA terminal 200. In the present embodiment, the wireless communication unit 210 performs wireless communication with the base station 100. In one example, the wireless communication unit 210 receives a wireless signal transmitted from the base station 100. The wireless communication unit 210 may have a function as an amplifier, a frequency converter, a demodulator, or the like, and may output, for example, the received data to the control unit 230. Furthermore, the wireless communication unit 210 transmits a wireless signal to the base station 100 via an antenna. The wireless communication unit 210 may have a function as a modulator, an amplifier, or the like, and thus may perform modulation or power-amplification on data outputted from the control unit 230 and then transmits it.

The wireless communication unit 210 according to the present embodiment performs wireless communication with another wireless communication device in accordance with the IEEE 802.11 standard. The wireless communication unit 210 may have a function of IEEE 802.11ac, and further has a communication function using OFDMA. In one example, the wireless communication unit 210 performs wireless communication using the specified radio resource under the control of the control unit 230.

In one example, the wireless communication unit 210 receives a channel segmentation management frame including one or more frequency segmentation patterns from the base station 100.

In one example, the wireless communication unit 210 may receive an OFDMA group ID management frame, which includes one or more OFDMA user IDs allocated by the base station 100, from the base station 100.

(2) Storage Unit 220

The storage unit 220 is a portion that stores and reproduces data with respect to various storage media. In one example, the storage unit 220 stores the schedule information received from the base station 100.

(3) Control Unit 230

The control unit 230 according to the present embodiment has a function of controlling wireless communication with the base station 100 using OFDMA. The control unit 230 also has a function of controlling wireless communication using 802.11ac, but a description thereof will be omitted.

In one example, the control unit 230 acquires schedule information relating to OFDMA from the PLCP header received by the wireless communication unit 210. Then, the control unit 230 controls the wireless communication unit 210 so that the wireless communication unit 210 may perform wireless communication with the base station 100 using OFDMA in accordance with the acquired schedule information.

The control unit 230 controls the wireless communication unit 210 so that the wireless communication unit 210 may perform wireless communication using the radio resource indicated by the resource block information included in the PLCP header. In that case, the control unit 230 also uses the information of the channel segmentation management frame and the OFDMA group ID management frame received in advance, in addition to the information included in the PLCP header. Specifically, the control unit 230 controls the wireless communication unit 210 so that the wireless communication unit 210 may use a frequency segment indicated by the to-be-used frequency information. This to-be-used frequency information is included in the resource block information among the frequencies (frequency segments) divided by one segmentation pattern indicated by the segmentation pattern identification information included in the PLCP header among the one or more segmentation patterns included in the channel segmentation management frame. In addition, the control unit 230 also controls the wireless communication unit 210 so that the wireless communication unit 210 may perform wireless communication using the radio resources indicated by the resource block information including the OFDMA user ID that matches the OFDMA user ID included in the OFDMA group ID management frame. In this way, it is possible for the control unit 230 to perform wireless communication in accordance with a result of scheduling by the base station 100.

The configuration example of the OFDMA terminal 200 according to the present embodiment has been described. Then, an example of operation processing of the wireless communication system 1 according to the present embodiment is described with reference to FIGS. 16 to 19.

3. OPERATION PROCESSING (1) Overall Processing Procedure

Figure 16:
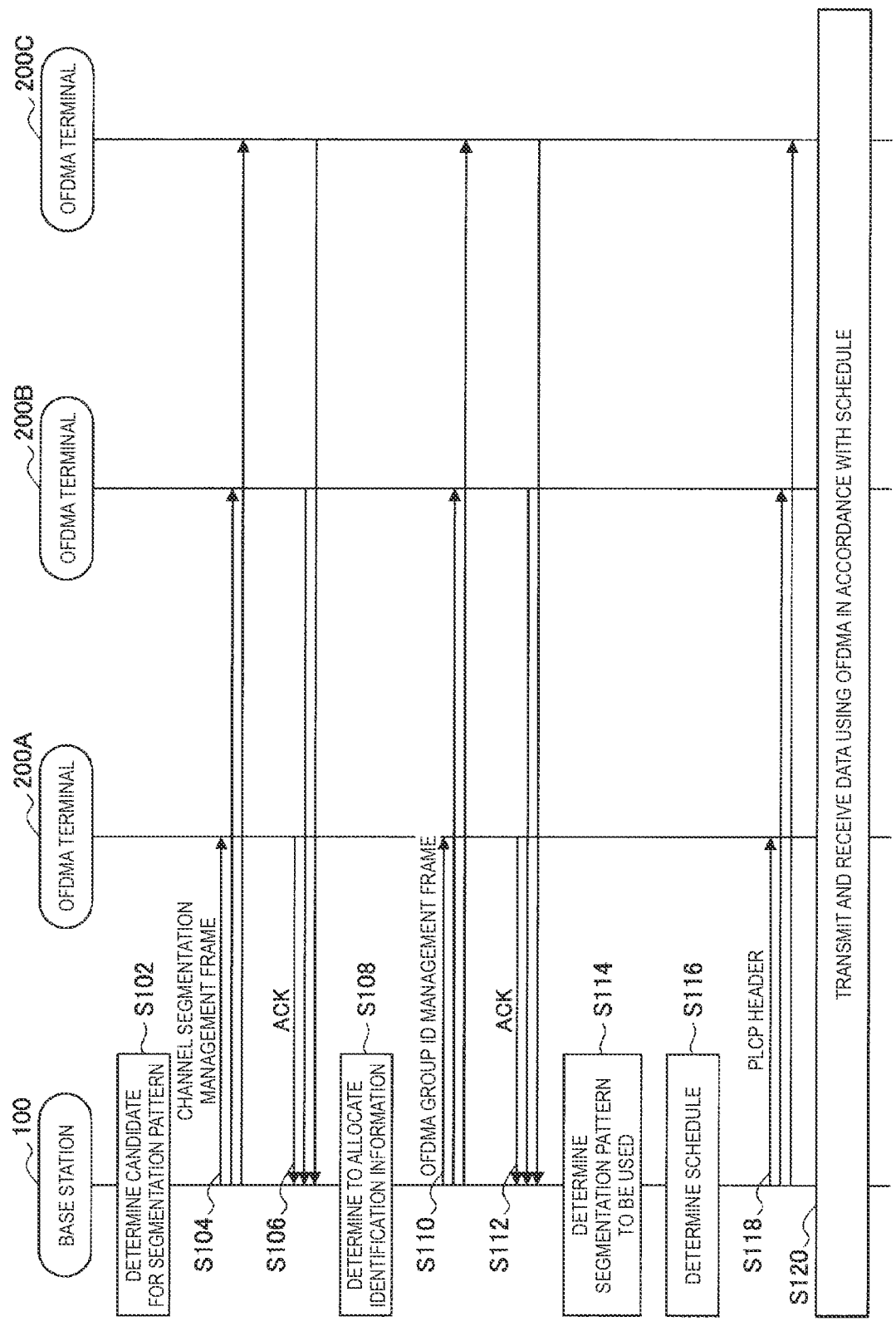
FIG. 16 is a sequence diagram showing an example of wireless communication processing procedure executed in the wireless communication system according to the present embodiment.

FIG. 16 is a sequence diagram showing an example of a wireless communication processing procedure executed in the wireless communication system 1 according to the present embodiment. As shown in FIG. 16, the base station 100, the OFDMA terminals 200A, 200B, and 200C are involved in this sequence.

In step S102, the base station 100 determines one or more segmentation pattern candidates that can be used in wireless communication with the OFDMA terminals 200A, 200B, and 200C.

Then, in step S104, the base station 100 transmits a channel segmentation management frame including one or more segmentation pattern candidates determined in step S102 to each of the OFDMA terminals. Moreover, the channel segmentation management frames transmitted to each of the OFDMA terminals 200 are identical to each other.

Then, in step S106, the base station 100 receives an ACK frame from each of the OFDMA terminals 200 that receive successfully the channel segmentation management frame.

Then, in step S108, the base station 100 determines to allocate identification information composed of a triplet of a group ID, a user position, and an OFDMA user ID to each of the OFDMA terminals 200.

Then, in step S110, the base station 100 transmits the OFDMA group ID management frame including the identification information determined in step S108 to each of the OFDMA terminals. Moreover, the OFDMA group ID management frames transmitted to each of the OFDMA terminals 200 are different from each other.

Then, in step S112, the base station 100 receives an ACK frame from each of the OFDMA terminals 200 that receive successfully the OFDMA group ID management frame.

Then, in step S114, the base station 100 determines a segmentation pattern to be used. In one example, the base station 100 determines one segmentation pattern of one or more segmentation pattern candidates determined in step S102 as a segmentation pattern to be used.

Then, in step S116, the base station 100 determines a schedule. In one example, in each time zone, the base station 100 determines a frequency segment to be used in wireless communication with each of the OFDMA terminals 200, determines whether to perform uplink communication or downlink communication, determines an MCS, and determines the transmission power.

Then, in step S118, the base station 100 transmits the PLCP header to each of the OFDMA terminals 200. Moreover, the PLCP headers transmitted to each of the OFDMA terminals 200 are identical to each other. The PLCP header includes segmentation pattern identification information indicating the segmentation pattern determined in step S114. In addition, the PLCP header includes one or more pieces of resource block information indicating the schedule determined in step S116.

Then, in step S120, the base station 100 transmits and receives data to and from the OFDMA terminals 200A, 200B, and 200C by using the OFDMA in accordance with the schedule determined in the step S116. The processing in this step is described in detail with reference to FIGS. 17 to 19.

(2) Processing Procedure in Base Station 100

Figure 17:
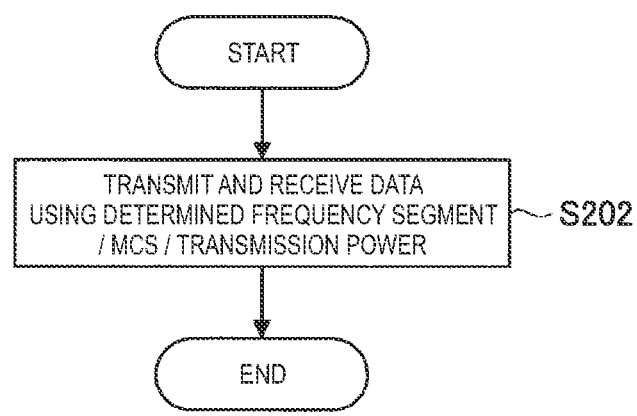
FIG. 17 is a flowchart showing an example of wireless communication processing procedure executed in a base station according to the present embodiment.

FIG. 17 is a flowchart illustrating an example of a wireless communication processing procedure executed in the base station 100 according to the present embodiment.

As illustrated in FIG. 17, in step S202, the control unit 130 controls the wireless communication unit 110 so that the wireless communication unit 110 may transmit and receive data using the frequency segment, the MCS, and the transmission power, which are determined in step S116.

(3) Processing Procedure in OFDMA Terminal 200

Figure 18:
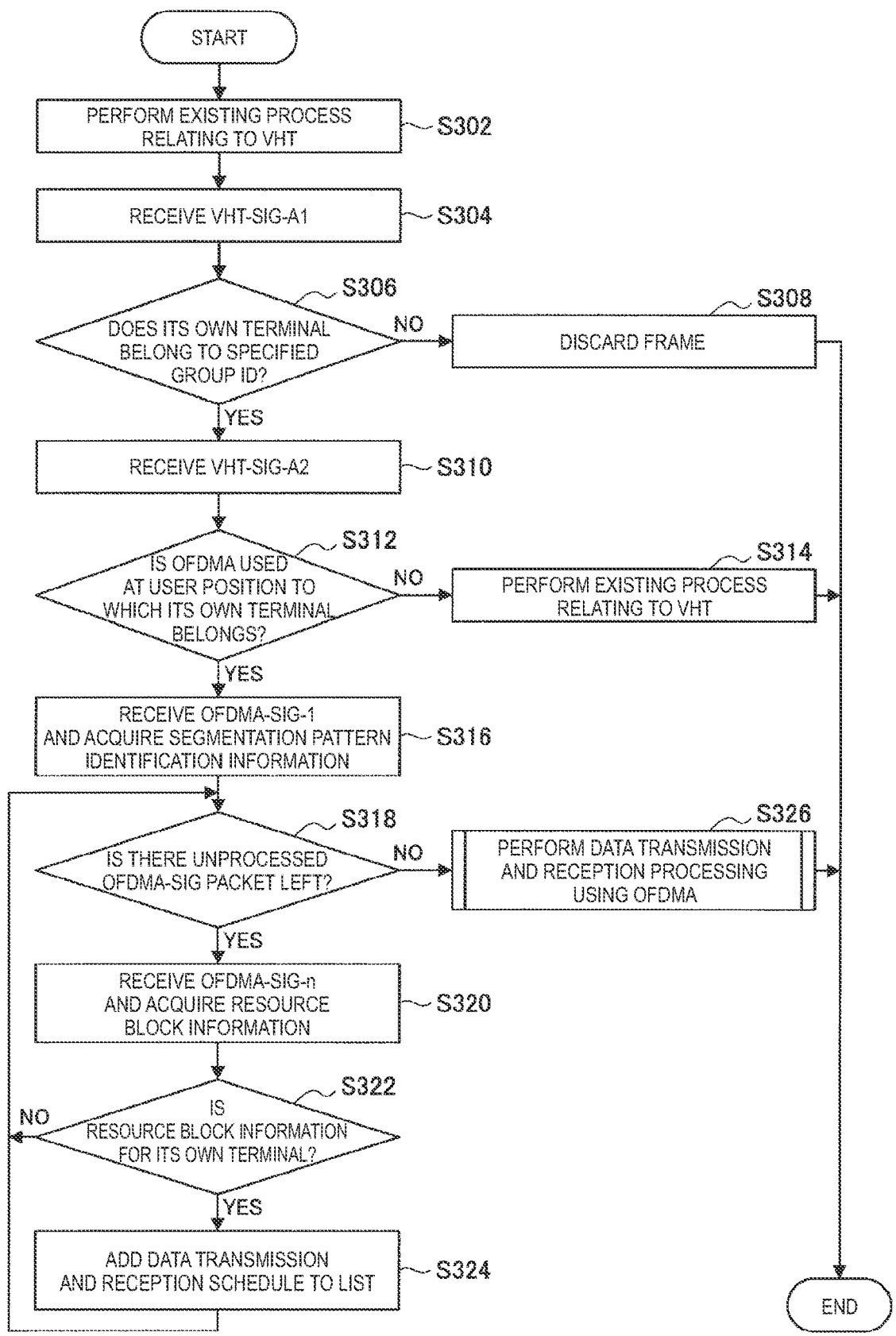
FIG. 18 is a flowchart showing an example of wireless communication processing procedure executed in the OFDMA terminal according to the present embodiment.

FIG. 18 is a flowchart illustrating an example of a wireless communication processing procedure executed in the OFDMA terminal 200 according to the present embodiment.

As illustrated in FIG. 18, in step S302, the OFDMA terminal 200 performs an existing process relating to the VHT until receiving the VHT-SIG-A packet in the PLCP header.

Then, in step S304, the wireless communication unit 210 receives the VHT-SIG-A1 packet.

Then, in step S306, the control unit 230 determines whether its own terminal belongs to the specified group ID. In one example, the control unit 230 refers to the information stored in B4 to B9 of the VHT-SIG-A1 packet to determine whether the received frame is a frame addressed to its own terminal.

If it is determined that its own terminal does not belong to the specified group ID (NO in S306), the control unit 230 discards the received frame in step S308.

On the other hand, if it is determined that the terminal belongs to the specified group ID (YES in S306), the wireless communication unit 210 receives the VHT-SIG-A2 packet in step S310. Although omitted here, the OFDMA terminal 200 performs processing to receive a VHT-STF packet and a VHT-LTF packet shown in FIG. 9 until performing this step.

Then, in step S312, the control unit 230 determines whether OFDMA is used at the user position to which its own terminal belongs. In one example, the control unit 230 determines whether there is OFDMA-SIG to follow by referring to a bit corresponding to the user position of its own terminal among B2 of the VHT-SIG-A1 packet or B7 to B9 of the VHT-SIG-A2 packet. The control unit 230 determines that OFDMA is used in the case where an OFDMA-SIG packet to follows, and determines that OFDMA is not used in the case where no OFDMA-SIG packet follows.

If it is determined that the OFDMA is not used at the user position to which its own terminal belongs (NO in S312), the control unit 230 controls the existing processing relating to the VHT at step S314.

On the other hand, if it is determined that OFDMA is used at the user position to which its own terminal belongs (YES in S312), the wireless communication unit 210 receives the OFDMA-SIG-1 packet, and the control unit 230 acquires the segmentation pattern identification information in step S316. In this regard, as described above with reference to FIG. 9, the control unit 230 acquires the segmentation pattern identification information by reading the CS pattern. Accordingly, the control unit 230 knows which segmentation pattern is used among the segmentation pattern candidates notified by using the channel segmentation management frame.

Then, in step S318, the control unit 230 determines whether there is an unprocessed OFDMA-SIG packet left. In one example, the control unit 230 refers to "RB Info Cont" of the last processed OFDMA-SIG and determines whether an unprocessed OFDMA-SIG packet follows.

If it is determined that there is an unprocessed OFDMA-SIG packet left (YES in S318), the wireless communication unit 210 receives the OFDMA-SIG-n 2) packet and the control unit 230 acquires resource block information in step S320.

Then, in step S322, the control unit 230 determines whether the resource block information is information for its own terminal. In one example, the control unit 230 determines whether the OFDMA user ID included in the resource block information matches the OFDMA user ID of its own terminal specified by the OFDMA group ID management frame.

If it is determined that the resource block information is information for its own terminal (YES in S322), the control unit 230 adds the data transmission and reception schedule to a list in step S324. In one example, the control unit 230 adds an event, which indicates that communication using the radio resource specified by the resource block information for its own terminal is performed, to a list. In this case, the control unit 230 converts the data transmission start time indicated by the resource block information into the event start time. Moreover, the control unit 230 controls the wireless communication with the base station 100 later in accordance with this list. After this step, the processing returns to step S318.

On the other hand, if it is determined that the resource block information is not information for its own terminal (NO in S322), the processing returns to step S318. In this way, the processes of steps S318 to S324 are repeated until there is no more unprocessed OFDMA-SIG packet. If it is determined in step S318 that there is no unprocessed OFDMA-SIG packet left (NO in S318), the OFDMA terminal 200 performs data transmission and reception processing using OFDMA in step S326. The processing in this step is described in detail with reference to FIG. 19.

Figure 19:
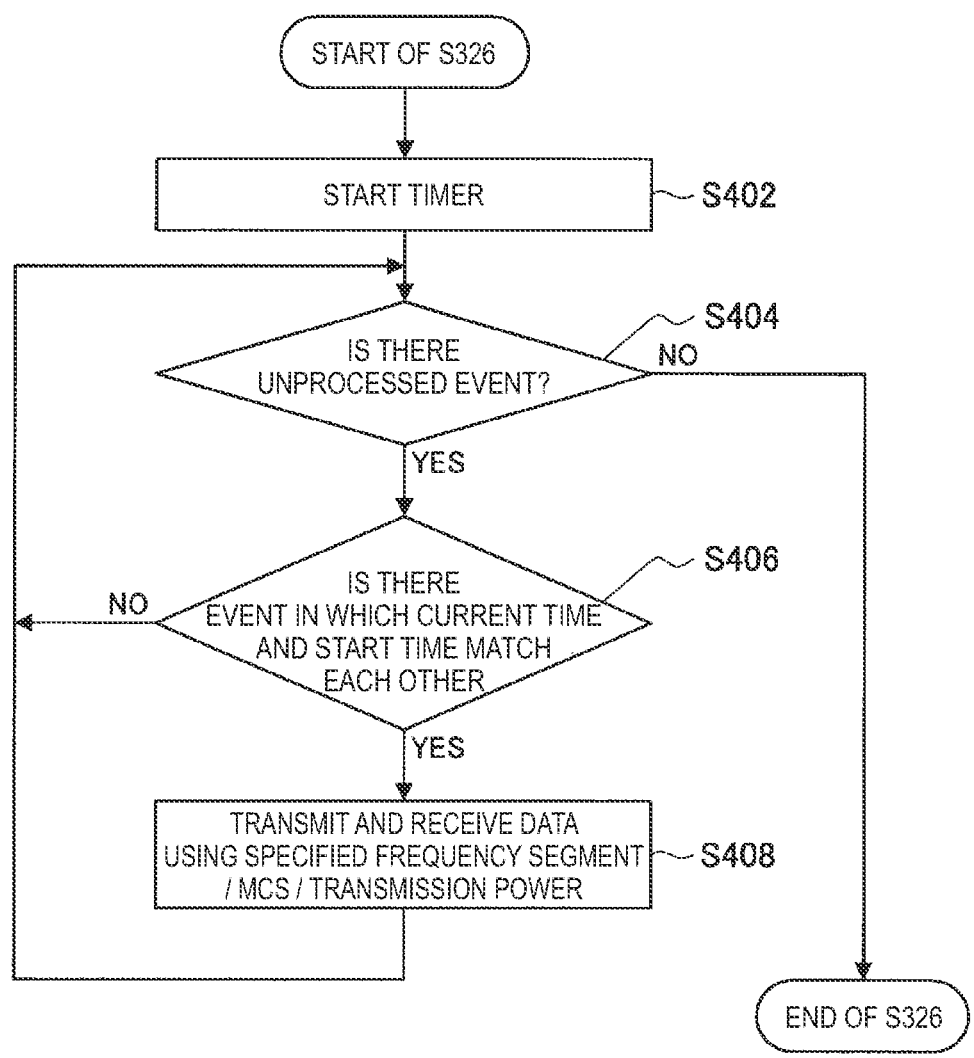
FIG. 19 is a flowchart showing an example of data transmission and reception processing procedure executed in the OFDMA terminal according to the present embodiment.

FIG. 19 is a flowchart showing an example of a procedure of data transmission and reception processing executed in the OFDMA terminal 200 according to the present embodiment.

As illustrated in FIG. 19, in step S402, the control unit 230 starts a timer.

Then, in step S404, the control unit 230 determines whether there is an unprocessed event in the list created in step S324.

If it is determined that there is an unprocessed event (YES in S404), the control unit 230 determines in step S406 whether there is an event in which the current time and the start time match each other in the list.

If it is determined that there is no event in which the current time and the start time match each other in the list (NO in S406), the processing returns to step S404.

If it is determined that there is the event in which the current time and the start time match each other in the list (YES in S406), the control unit 230 controls the wireless communication unit 210 so that the wireless communication unit 210 may transmit and receive data using the frequency segment (indicated by the resource block information), MCS, and transmission power, specified by the event, in step S408. Moreover, even if the current time has already passed the start time, the control unit 230 performs the processing in accordance with this step. The control unit 230 deletes the processed event from the list. After this step, the processing returns to step S404.

The processes of steps S404 to S408 are repeated until there are no unprocessed events left. If it is determined in step S404 that there is no unprocessed event left (NO in S404), the processing is terminated.

4. APPLICATION EXAMPLES

The technology according to the present disclosure is applicable to various products. In one example, the OFDMA terminal 200 may be implemented as mobile terminals such as smartphones, tablet personal computers (PCs), notebook PCs, portable game terminals, and digital cameras, fixed-type terminals such as television receivers, printers, digital scanners, and network storages, or in-vehicle terminals such as car navigation devices. In addition, the OFDMA terminal 200 may be implemented as terminals which perform machine-to-machine (M2M) communication (also referred to as machine type communication (MTC) terminals), such as smart meters, vending machines, remote monitoring devices, and point of sale (POS) terminals. Furthermore, the OFDMA terminal 200 may be wireless communication modules (e.g., an integrated circuit module composed of a single die) installed in such terminals.

On the other hand, in one example, the base station 100 may be implemented as a wireless LAN access point (also referred to as a wireless base station) having or not having a router function. In addition, the base station 100 may be implemented as a mobile wireless LAN router. Furthermore, the base station 100 may be wireless communication modules (e.g., an integrated circuit module composed of a single die) installed in such devices.

[4-1. First Application Example]

Figure 20:
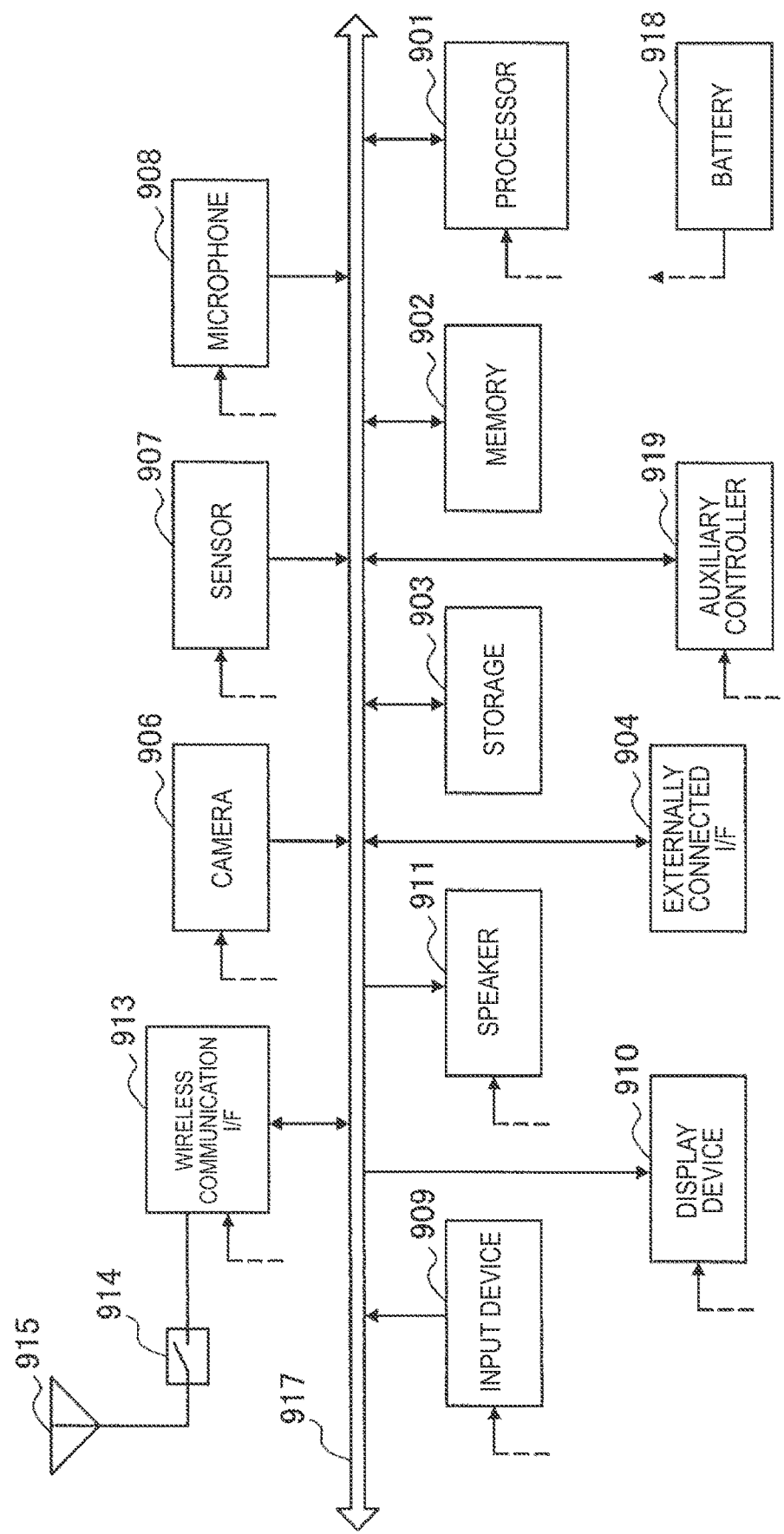
FIG. 20 is a block diagram illustrating an example of a schematic configuration of a smartphone.

FIG. 20 is a block diagram illustrating an example of a schematic configuration of a smartphone 900 to which the technology according to the present disclosure can be applied. The smartphone 900 is configured to include a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores data and programs executed by the processor 901. The storage 903 can include a storage medium such as a semiconductor memory or a hard disk. The externally connected interface 904 is an interface for connecting an externally attached device, such as a memory card or a universal serial bus (USB) device, to the smartphone 900.

The camera 906 has an image sensor, for example, a charge coupled device (CCD) or a complementary metal oxide semiconductor (CMOS) to generate a captured image. The sensor 907 can include a group of sensors including, for example, a positioning sensor, a gyro sensor, a geomagnetic sensor, an acceleration sensor, and the like. The microphone 908 converts sound inputted to the smartphone 900 into an audio signal. The input device 909 includes, for example, a touch sensor that detects a touch on a screen of the display device 910, a keypad, a keyboard, a button, a switch, and the like to accept an operation or information input from a user. The display device 910 has a screen, such as a liquid crystal display (LCD), or an organic light emitting diode (OLED) display, and displays an output image of the smartphone 900. The speaker 911 converts an audio signal outputted from the smartphone 900 into sound.

The wireless communication interface 913 supports one or more wireless LAN standards such as IEEE 802.11a, 11b, 11g, 11n, 11ac, and 11ad, and performs wireless LAN communication. The wireless communication interface 913 can communicate with other devices via a wireless LAN access point in an infrastructure mode. In addition, the wireless communication interface 913 can directly communicate with other devices in a direct communication mode such as ad hoc mode, Wi-Fi Direct (registered trademark), or the like. Moreover, in Wi-Fi Direct, one of the two terminals operates as an access point unlike ad hoc mode, but communication is performed directly between the terminals. The wireless communication interface 913 can typically include a baseband processor, a radio frequency (RF) circuit, a power amplifier, and the like. The wireless communication interface 913 may be a one-chip module on which a memory for storing a communication control program, a processor for executing the program, and a relevant circuit are integrated. The wireless communication interface 913 may support other types of wireless communication schemes such as a cellular communication scheme, a short-range wireless communication scheme, or a proximity wireless communication scheme, in addition to the wireless LAN scheme. The antenna switch 914 switches a connection destination of the antenna 915 between a plurality of circuits (e.g., circuits for different wireless communication schemes) included in the wireless communication interface 913. The antenna 915 has a single or a plurality of antenna elements (e.g., a plurality of antenna elements constituting a MIMO antenna), and is used for transmission and reception of a wireless signal from the wireless communication interface 913.

Moreover, the smartphone 900 may include, but not limited to the example of FIG. 20, a plurality of antennas (e.g., antennas for a wireless LAN or antennas for a proximity wireless communication scheme, or the like). In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 20 via power supply lines partially indicated by dashed lines in the figure. In one example, the auxiliary controller 919 causes the smartphone 900 to operate necessary minimum functions in a sleep mode.

The smartphone 900 shown in FIG. 20 can be implemented as the OFDMA terminal 200. In one example, the wireless communication unit 210, the storage unit 220, and the control unit 230, which are described with reference to FIG. 15, may be provided in the wireless communication interface 913. In addition, at least some of these functions may be provided in the processor 901 or the auxiliary controller 919.

Moreover, the smartphone 900 may operate as a wireless access point (software AP) by the processor 901 executing an access point function at the application level. In addition, the wireless communication interface 913 may have a wireless access point function.

4-2. Second Application Example

Figure 21:
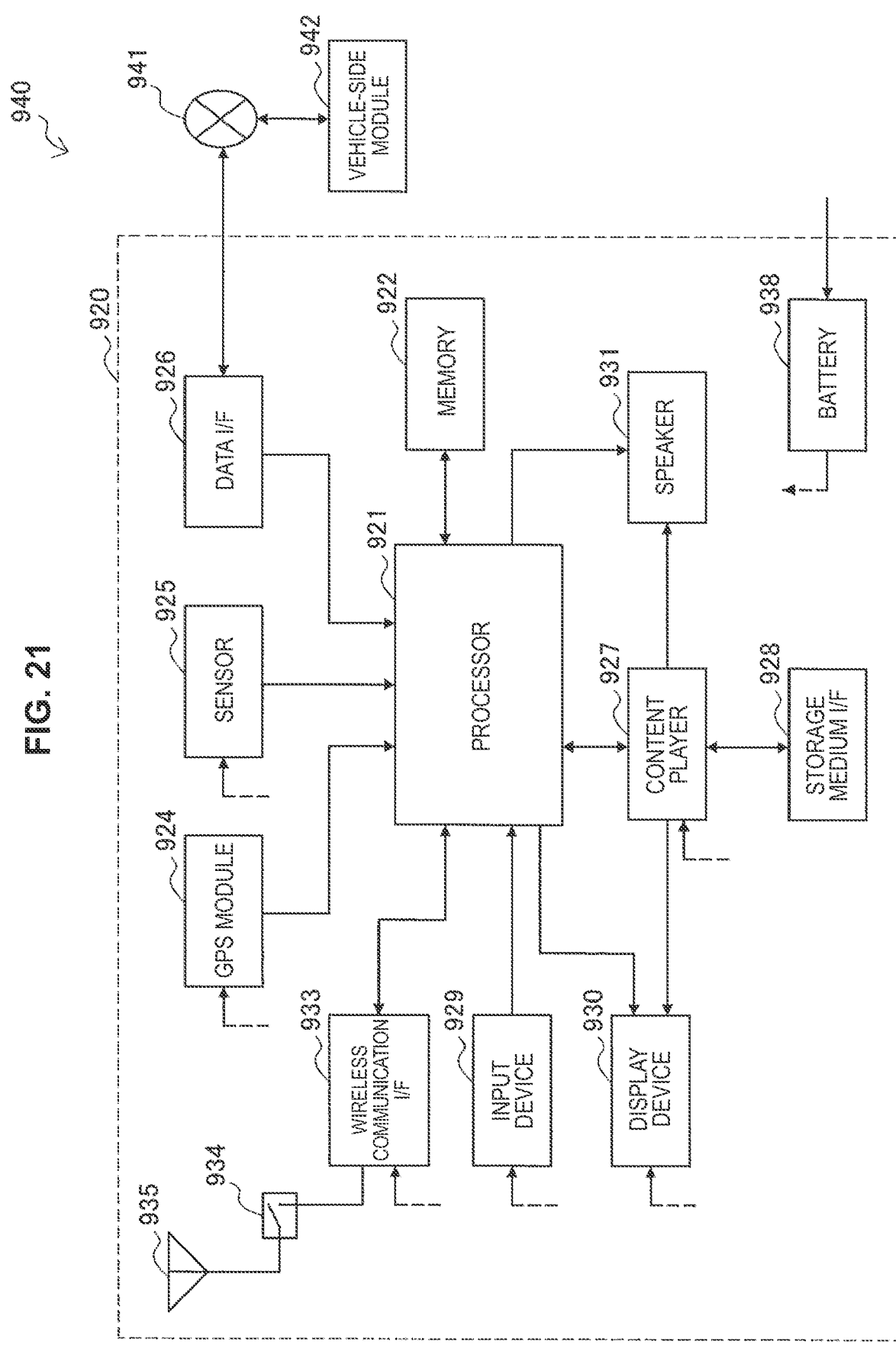
FIG. 21 is a block diagram illustrating an example of a schematic configuration of a car navigation device.

FIG. 21 is a block diagram illustrating an example of a schematic configuration of a car navigation device 920 to which the technology according to the present disclosure can be applied. The car navigation device 920 is configured to include a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC, and controls a navigation function and other functions of the car navigation device 920. The memory 922 includes a RAM and a ROM, and stores data and programs executed by the processor 921.

The GPS module 924 measures a position of the car navigation device 920 (e.g., latitude, longitude, and altitude) using GPS signals received from a GPS satellite. The sensor 925 can include a group of sensors including, for example, a gyro sensor, a geomagnetic sensor, a barometric sensor, and the like. The data interface 926 is connected to an in-vehicle network 941, for example, via a terminal that is not illustrated, and acquires data generated on the vehicle side such as vehicle speed data.

The content player 927 reproduces content stored in a storage medium (e.g., CD or DVD) inserted into the storage medium interface 928. The input device 929 includes, for example, a touch sensor that detects a touch on a screen of the display device 930, a button, a switch, and the like to accept an operation or information input from a user. The display device 930 has a screen such as an LCD or an OLED display, and displays an image of content to be reproduced or navigation function. The speaker 931 outputs sound of content to be reproduced or navigation function.

The wireless communication interface 933 supports one or more wireless LAN standards such as IEEE 802.11a, 11b, 11g, 11n, 11ac, and 11ad, and performs wireless LAN communication. The wireless communication interface 933 can communicate with other devices via a wireless LAN access point in the infrastructure mode. In addition, the wireless communication interface 933 can directly communicate with other devices in a direct communication mode such as ad hoc mode, Wi-Fi Direct, or the like. The wireless communication interface 933 can typically have a baseband processor, an RF circuit, a power amplifier, and the like. The wireless communication interface 933 may be a one-chip module on which a memory for storing a communication control program, a processor for executing the program, and a relevant circuit are integrated. The wireless communication interface 933 may support other types of wireless communication schemes such as a short-range wireless communication scheme, a proximity wireless communication scheme, or the cellular communication scheme, in addition to the wireless LAN scheme. The antenna switch 934 switches a connection destination of the antenna 935 between a plurality of circuits included in the wireless communication interface 933. The antenna 935 has a single or a plurality of antenna elements and is used for transmission and reception of a wireless signal from the wireless communication interface 933.

Moreover, the car navigation device 920 may include, but not limited to the example of FIG. 21, a plurality of antennas. In this case, the antenna switch 934 may be omitted from the configuration of the car navigation device 920.

The battery 938 supplies electric power to each of the blocks of the car navigation device 920 shown in FIG. 21 via power supply lines partially indicated by dashed lines in the figure. In addition, the battery 938 accumulates electric power supplied from the vehicle side.

The car navigation device 920 shown in FIG. 21 can be implemented as the OFDMA terminal 200. In one example, the wireless communication unit 210, the storage unit 220, and the control unit 230, which are described with reference to FIG. 15, may be provided in the wireless communication interface 933. In addition, at least some of these functions may be provided in the processor 921.

Furthermore, the wireless communication interface 933 may operate as the above-described base station 100, and may provide wireless connection to a terminal carried by a user riding in a vehicle.

Furthermore, the technology according to the present disclosure may be implemented as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

Figure 22:
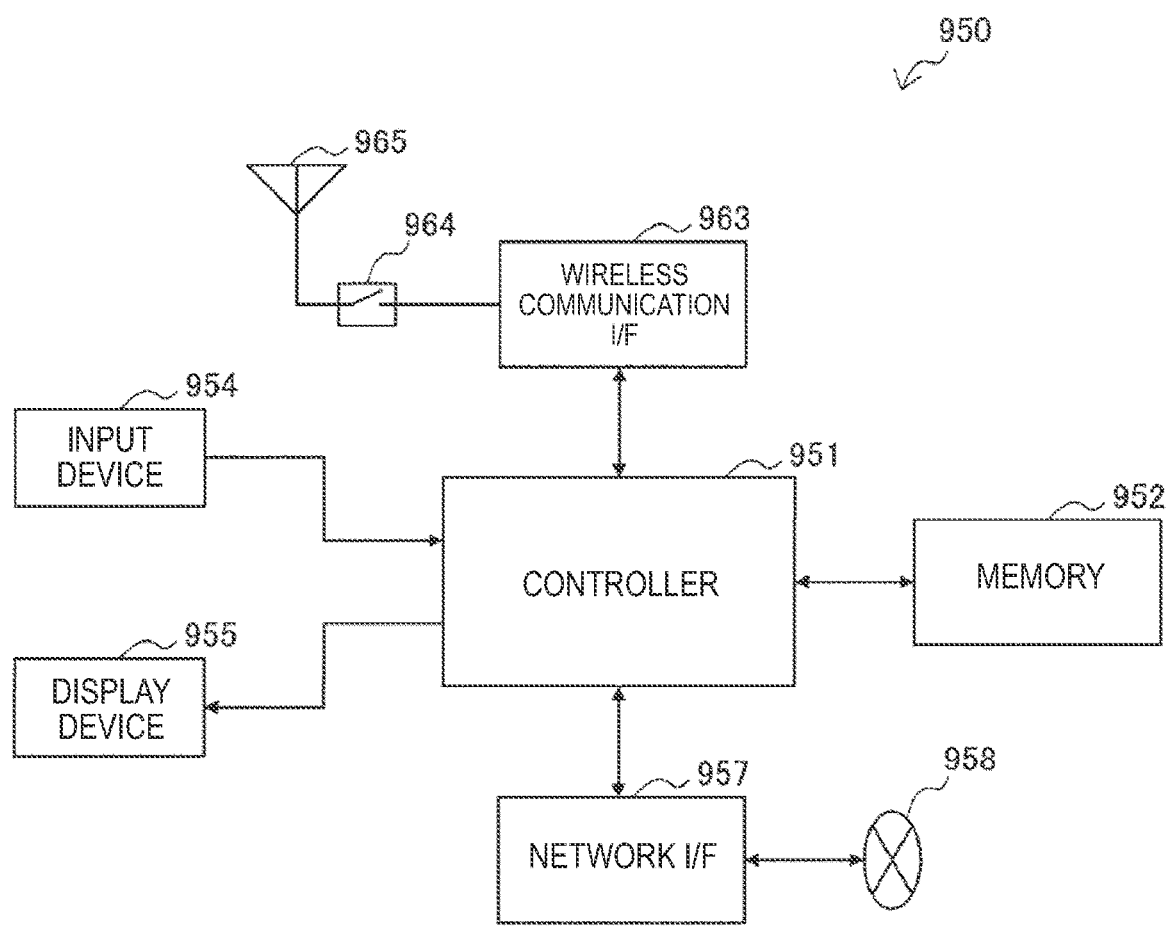
FIG. 22 is a block diagram illustrating an example of a schematic configuration of a wireless access point.

FIG. 22 is a block diagram illustrating an example of a schematic configuration of a wireless access point 950 to which the technology according to the present disclosure can be applied. The wireless access point 950 is configured to include a controller 951, a memory 952, an input device 954, a display device 955, a network interface 957, a wireless communication interface 963, an antenna switch 964, and an antenna 965.

The controller 951 may be, for example, a CPU or a digital signal processor (DSP), and causes the wireless access point 950 to operate various functions (e.g., access restriction, routing, encryption, firewall, and log management) of the Internet Protocol (IP) layer and higher layers. The memory 952 includes a RAM and a ROM and stores a program to be executed by the controller 951 and various control data (e.g., a terminal list, a routing table, an encryption key, a security setting, and a log).

The input device 954 includes, for example, a button or a switch, and accepts an operation from a user. The display device 955 includes an LED lamp or the like, and displays operation status of the wireless access point 950.

The network interface 957 is a wired communication interface used to connect the wireless access point 950 to the wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards such as IEEE 802.11a, 11b, 11g, 11n, 11ac, and 11ad, and provides a wireless connection to a terminal located nearby by serving as an access point. The wireless communication interface 963 can typically have a baseband processor, an RF circuit, a power amplifier, and the like. The wireless communication interface 963 may be a one-chip module on which a memory for storing a communication control program, a processor for executing the program, and a relevant circuit are integrated. The antenna switch 964 switches a connection destination of the antenna 965 between a plurality of circuits included in the wireless communication interface 963. The antenna 965 has a single or a plurality of antenna elements, and is used for transmission and reception of a wireless signal from the wireless communication interface 963.

The wireless access point 950 shown in FIG. 22 may be implemented as the base station 100. In one example, the wireless communication unit 110, the storage unit 120, and the control unit 130, which are described with reference to FIG. 2, may be provided in the wireless communication interface 963. At least some of these functions may be provided in the controller 951.

5. SUMMARY

One embodiment of the present disclosure has been described in detail with reference to FIGS. 1 to 22. According to the above-described embodiment, the base station that performs wireless communication with the terminal device using IEEE 802.11 includes schedule information relating to the OFDMA in the PLCP header and transmits it to the OFDMA terminal. This makes it possible for the base station to perform wireless communication using OFMDA with the terminal device, and thus it is possible to improve the utilization efficiency of radio resources in the wireless LAN system. Furthermore, in the present embodiment, the PLCP header includes resource block information relating to wireless communication using OFDMA performed between the base station and the terminal device while maintaining the legacy field and the field for the 802.11ac compatible terminal. This makes it possible for the wireless communication system 1 according to the present embodiment to maintain the backward compatibility.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Moreover, the series of processes carried out by each device described in the present specification may be implemented by using software, hardware, or a combination of software and hardware. Programs that compose such software may be stored in advance for example on a storage medium (non-transitory medium) provided inside or outside each device. As one example, during execution by a computer, such programs are loaded into a random access memory (RAM) and are executed by a processor such as a CPU.

Moreover, it is not necessary for the processes described in this specification with reference to the flowchart or sequence diagram to be executed in the order shown in the flowchart or sequence diagram. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A wireless communication device including:

a wireless communication unit configured to perform wireless communication with another wireless communication device in accordance with an IEEE 802.11 standard; and a control unit configured to control the wireless communication unit so that the wireless communication unit includes schedule information in a physical layer convergence protocol (PLCP) header defined in the IEEE 802.11 standard and transmits the schedule information to the other wireless communication device, the schedule information relating to orthogonal frequency-division multiple access (OFDMA).

(2)

The wireless communication device according to (1), wherein the control unit controls the wireless communication unit so that the wireless communication unit performs wireless communication with the other wireless communication device using the OFDMA in accordance with the schedule information.

(3)

The wireless communication device according to (1) or (2), wherein the PLCP header includes one or more pieces of resource block information as the schedule information, the resource block information serving as information relating to a resource block used in the wireless communication with the other wireless communication device.

(4)

The wireless communication device according to (3), wherein the resource block information includes OFDMA identification information serving as information for identifying the other wireless communication device from a user multiplexed by the OFDMA, and to-be-used frequency information indicating a frequency to be used.

(5)

The wireless communication device according to (4), wherein the control unit controls the wireless communication unit so that the wireless communication unit transmits an action frame including one or more frequency segmentation patterns to the other wireless communication device.

(6)

The wireless communication device according to (5), wherein the PLCP header includes, as the schedule information, segmentation pattern identification information indicating one segment pattern of the one or more segmentation patterns that is to be used, and the segmentation pattern identification information is used in common by users multiplexed by the OFDMA.

(7)

The wireless communication device according to (6), wherein the to-be-used frequency information is information indicating at least one of frequencies divided by the segmentation pattern indicated by the segmentation pattern identification information.

(8)

The wireless communication device according to any one of (4) to (7), wherein the schedule information included in the PLCP header is transmitted by using an OFDMA-related packet.

(9)

The wireless communication device according to (8), wherein one piece of the resource block information is transmitted by using one or a plurality of the OFDMA-related packets in succession.

(10)

The wireless communication device according to (8) or (9), wherein each of the OFDMA-related packets includes one piece of the resource block information.

(11)

The wireless communication device according to any one of (8) to (10), wherein the OFDMA-related packet includes information indicating whether another OFDMA-related packet follows.

(12)

The wireless communication device according to any one of (8) to (11), wherein the control unit controls padding processing so that a total size of one or more of the OFDMA-related packets included in one frame is an integer multiple of the number of bits per symbol.

(13)

The wireless communication device according to any one of (4) to (12), wherein the control unit controls the wireless communication unit so that the wireless communication unit transmits an action frame to the other wireless communication device, the action frame including one or more pieces of the OFDMA identification information allocated to the other wireless communication device.

(14)

A wireless communication device including:
a wireless communication unit configured to perform wireless communication with another wireless communication device in accordance with an IEEE 802.11 standard; and
a control unit configured to acquire schedule information relating to OFDMA from a PLCP header received by the wireless communication unit, the PLCP header being defined in the IEEE 802.11 standard.

(15)

The wireless communication device according to (14), wherein the control unit controls the wireless communication unit so that the wireless communication unit performs wireless communication with the other wireless communication device using the OFDMA in accordance with the schedule information.

(16)

The wireless communication device according to (15), wherein the control unit controls the wireless communication unit so that the wireless communication unit performs wireless communication using a radio resource indicated by resource block information included in the PLCP header.

(17)

The wireless communication device according to (16), wherein the wireless communication unit receives an action frame including one or more frequency segmentation patterns from the other wireless communication device, and
the control unit controls the wireless communication unit so that the wireless communication unit uses a frequency indicated by to-be-used frequency information included in the resource block information among frequencies divided by one segmentation pattern of the one or more segmentation patterns, the one segmentation pattern being indicated by segmentation pattern identification information included in the PLCP header.

(18)

The wireless communication device according to (16) or (17), wherein the wireless communication unit receives an action frame from the other wireless communication device, the action frame including one or more pieces of OFDMA identification information allocated by the other wireless communication device, and
the control unit controls the wireless communication unit so that the wireless communication unit performs wireless communication using a radio resource indicated by the resource block information including the OFDMA identification information that matches the OFDMA identification information included in the action frame.

(19)

A method of wireless communication in a wireless communication device that performs wireless communication with another wireless communication device in accordance with an IEEE 802.11 standard, the method including:
controlling schedule information relating to OFDMA to be included in a PLCP header defined in the IEEE 802.11 standard and to be transmitted to the other wireless communication device.

(20)

A method of wireless communication in a wireless communication device that performs wireless communication with another wireless communication device in accordance with an IEEE 802.11 standard, the method including:
acquiring schedule information relating to OFDMA from a PLCP header defined in the IEEE 802.11 standard.

REFERENCE SIGNS LIST

1 wireless communication system
10 spatial stream
11 subcarrier
100 base station
110 wireless communication unit
120 storage unit
130 control unit
200 OFDMA terminal
210 wireless communication unit
220 storage unit
230 control unit
300 VHT terminal

The invention claimed is:

1. A first wireless communication device, comprising:
circuitry configured to:
wirelessly communicate with a second wireless communication device based on an Institute of Electrical and Electronics Engineers (IEEE) 802.11 standard;
control schedule information to be included in a header portion of physical layer protocol data unit (PPDU) defined in the IEEE 802.11 standard, wherein the schedule information is associated with orthogonal frequency-division multiple access (OFDMA); and control transmission of the PPDU to the second wireless communication device, wherein the header portion comprises a first field, a second field, and a third field, the first field comprises flag information that identifies the second field and the third field, the second field comprises length information that indicates a length of the third field, the third field comprises a common field and a plurality of user specific fields, the third field indicates a plurality of resources to be used by each user in the plurality of user specific fields by a combination of the common field and a user specific field of the plurality of user specific fields, the common field comprises resource information related to a resource allocation pattern in frequency domain, the resource information is represented by a first number of bits, the first number of bits is set based on frequency bandwidth for the transmission of the PPDU, the first number of bits is different between a first case in which the frequency bandwidth corresponds to 40 MHz, a second case in which the frequency bandwidth corresponds to 80 MHz, and a third case in which the frequency bandwidth corresponds to 80+80 MHz, each user specific field of the plurality of user specific fields comprises a terminal identifier (ID) and Modulation and Coding Scheme (MCS) information, the terminal ID being represented by a second number of bits, the MCS information is represented by a third number of bits, the second number of bits is larger than the third number of bits, and the third number of bits corresponds to 4.

2. The first wireless communication device according to claim 1, wherein the circuitry is further configured to execute the wireless communication with the second wireless communication device using the OFDMA based on the schedule information.

3. The first wireless communication device according to claim 1, wherein the circuitry is further configured to transmit the schedule information of the header portion based on a first OFDMA-related packet of a plurality of OFDMA-related packets.

4. The first wireless communication device according to claim 3, wherein the first OFDMA-related packet includes second information indicating whether a second OFDMA-related packet of the plurality of OFDMA-related packets follows the first OFDMA-related packet.

5. The first wireless communication device according to claim 3, wherein the circuitry is further configured to control padding processing such that a total size of the plurality of the OFDMA-related packets included in one frame is an integer multiple of a number of bits per symbol.

6. The first wireless communication device according to claim 1, wherein the header portion further comprises one of uplink information or downlink information that indicates that a transmission is one of uplink or downlink.

7. The first wireless communication device according to claim 1, wherein the third field further comprises second information to schedule multi-user multiple-input multiple-output (MU-MIMO).

8. The first wireless communication device according to claim 1, wherein the circuitry is further configured to execute the wireless communication based on IEEE 802.11ac standard.

9. A first wireless communication device, comprising:
circuitry configured to:
wirelessly communicate with a second wireless communication device based on an Institute of Electrical and Electronics Engineers (IEEE) 802.11 standard; and control reception of a physical layer protocol data unit (PPDU) from the second wireless communication device, wherein a header portion of the PPDU includes schedule information associated with orthogonal frequency-division multiple access (OFDMA), the header portion comprises a first field, a second field, and a third field, the first field comprises flag information that identifies the second field and the third field, the second field comprises length information that indicates a length of the third field, the third field comprises a common field and a plurality of user specific fields, the third field indicates a plurality of resources to be used by each user in the plurality of user specific fields by a combination of the common field and a user specific field of the plurality of user specific fields, the common field comprises resource information related to a resource allocation pattern in frequency domain, the resource information is represented by a first number of bits, the first number of bits is set based on frequency bandwidth for transmission of the PPDU, the first number of bits is different between a first case in which the frequency bandwidth corresponds to 40 MHz, a second case in which the frequency bandwidth corresponds to 80 MHz, and a third case in which the frequency bandwidth corresponds to 80+80 MHz, each user specific field of the plurality of user specific fields comprises a terminal identifier (ID) and Modulation and Coding Scheme (MCS) information, the terminal ID being represented by a second number of bits, the MCS information is represented by a third number of bits, the second number of bits is larger than the third number of bits, and the third number of bits corresponds to 4.

10. The first wireless communication device according to claim 9, wherein the header portion further comprises one of uplink or downlink information that indicates that a transmission is one of uplink or downlink.

11. The first wireless communication device of claim 9, wherein the third field further comprises second information to schedule multi-user multiple-input multiple-output (MU-MIMO).

12. The first wireless communication device according to claim 9, wherein the circuitry is further configured to execute wireless communication based on IEEE 802.11ac standard.

13. A method for wireless communication, the method comprising:

in a first wireless communication device configured to communicate with a second wireless communication device based on an Institute of Electrical and Electronics Engineers (IEEE) 802.11 standard:
controlling schedule information to be included in a header portion of physical layer protocol data unit (PPDU) defined in the IEEE 802.11 standard, wherein the schedule information is associated with orthogonal frequency-division multiple access (OFDMA); and
controlling transmission of the PPDU to the second wireless communication device, wherein
the header portion comprises a first field, a second field, and a third field,
the first field comprises flag information that identifies the second field and the third field,
the second field comprises length information that indicates a length of the third field,
the third field comprises a common field and a plurality of user specific fields,
the third field indicates a plurality of resources to be used by each user in the plurality of user specific fields by a combination of the common field and a user specific field of the plurality of user specific fields,
the common field comprises resource information related to a resource allocation pattern in frequency domain,
the resource information is represented by a first number of bits,
the first number of bits is set depending on frequency bandwidth for transmitting the PPDU,
the first number of bits is different between a first case in which the frequency bandwidth corresponds to 40 MHz, a second case in which the frequency bandwidth corresponds to 80 MHz, and a third case in which the frequency bandwidth corresponds to 80+80 MHz,
each user specific field of the plurality of user specific fields comprises a terminal identifier (ID) and Modulation and Coding Scheme (MCS) information, the terminal ID being represented by a second number of bits, the MCS information is represented by a third number of bits,
the second number of bits is larger than the third number of bits, and
the third number of bits corresponds to 4.

14. A method for wireless communication, the method comprising:
in a first wireless communication device:
wirelessly communicating with a second wireless communication device based on an Institute of Electrical and Electronics Engineers (IEEE) 802.11 standard; and
control reception of a physical layer protocol data unit (PPDU) from the second wireless communication device, wherein
a header portion of the PPDU includes schedule information associated with orthogonal frequency-division multiple access (OFDMA),
the header portion comprises a first field, a second field, and a third field,
the first field comprises flag information that identifies the second field and the third field,
the second field comprises length information that indicates a length of the third field,
the third field comprises a common field and a plurality of user specific fields,
the third field indicates a plurality of resources to be used by each user in the plurality of user specific fields by a combination of the common field and a user specific field of the plurality of user specific fields,
the common field comprises resource information related to a resource allocation pattern in frequency domain,
the resource information is represented by a first number of bits,
the first number of bits is set based on frequency bandwidth for transmission of the PPDU,
the first number of bits is different between a first case in which the frequency bandwidth corresponds to 40 MHz, a second case in which the frequency bandwidth corresponds to 80 MHz, and a third case in which the frequency bandwidth corresponds to 80+80 MHz,
each user specific field of the plurality of user specific fields comprises a terminal identifier (ID) and Modulation and Coding Scheme (MCS) information, the terminal ID being represented by a second number of bits, the MCS information is represented by a third number of bits, and
the second number of bits is larger than the third number of bits, and
the third number of bits corresponds to 4.

* * * * *